United States Patent
Bacquie et al.

(10) Patent No.: US 10,316,823 B2
(45) Date of Patent: Jun. 11, 2019

(54) WIND TURBINE GROUP CONTROL FOR VOLANT ANIMAL SWARMS

(71) Applicants: Janine E. Bacquie, Jupiter, FL (US); Hector K. Lopez, Jupiter, FL (US)

(72) Inventors: Janine E. Bacquie, Jupiter, FL (US); Hector K. Lopez, Jupiter, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 72 days.

(21) Appl. No.: 15/459,849

(22) Filed: Mar. 15, 2017

(65) Prior Publication Data
US 2018/0266393 A1    Sep. 20, 2018

(51) Int. Cl.
| G05B 19/042 | (2006.01) |
| F03D 7/04 | (2006.01) |
| F03D 17/00 | (2016.01) |
| G05B 19/048 | (2006.01) |
| G05B 23/02 | (2006.01) |

(52) U.S. Cl.
CPC ............ *F03D 7/048* (2013.01); *F03D 17/00* (2016.05); *G05B 19/048* (2013.01); *G05B 23/0289* (2013.01); *G05B 2219/2619* (2013.01); *Y02E 10/723* (2013.01); *Y02E 10/725* (2013.01)

(58) Field of Classification Search
CPC ... Y02E 10/723; A01M 31/002; A01M 29/06; F03D 80/10; F03D 7/048; F03D 7/0264; F03D 13/00; A01K 11/006; G06K 9/6267; G06K 9/00369; G06K 9/0063; G06K 9/00335; G06K 9/00624; G06K 2009/00738; G06K 9/00362; G06K 9/00711; G06K 9/4604; G06T 7/20
See application file for complete search history.

(56) References Cited

U.S. PATENT DOCUMENTS

| 6,623,243 | B1 * | 9/2003 | Hodos | A61B 5/0496 416/61 |
| 7,315,799 | B1 * | 1/2008 | Podolsky | F03D 80/00 703/2 |
| 8,050,899 | B2 * | 11/2011 | Giguere | G06Q 10/06 703/6 |
| 8,116,527 | B2 | 2/2012 | Sabol et al. | |
| 8,554,519 | B2 * | 10/2013 | Dilkina | G06F 17/50 703/1 |

(Continued)

FOREIGN PATENT DOCUMENTS

JP    2008000072 A  *  1/2008

*Primary Examiner* — Darrin D Dunn
(74) *Attorney, Agent, or Firm* — Tarolli, Sundheim, Covell & Tummino LLP

(57) ABSTRACT

Groups of wind turbines at a wind farm are controlled based on detection of volant animal swarms. A risk score is defined for each of a plurality of wind turbine groups of the wind farm at a default risk score based on predetermined data. A respective operational parameter is set for each wind turbine of each of the wind turbine groups based on the respective risk score. The presence of a volant animal swarm is detected in a region associated with a given one of the wind turbine groups via a volant animal detection system. The risk score of the given one wind turbine group and an adjacent wind turbine group is changed from the default risk score to temporary risk scores in response to detection of the volant animal swarm.

16 Claims, 14 Drawing Sheets

(56) References Cited

U.S. PATENT DOCUMENTS

| | | | | |
|---|---|---|---|---|
| 8,742,977 B1* | 6/2014 | Piesinger | | A01M 29/16 342/159 |
| 8,862,259 B2* | 10/2014 | Kobayashi | | C23C 14/34 204/192.3 |
| 8,988,230 B2* | 3/2015 | Nohara | | A01M 29/06 119/713 |
| 9,165,092 B2* | 10/2015 | Hazra | | G06F 17/50 |
| 9,521,830 B2* | 12/2016 | Wenger | | A01K 29/005 |
| 9,816,486 B2* | 11/2017 | Wenger | | A01K 29/005 |
| 2007/0138797 A1* | 6/2007 | Reidy | | F03D 9/00 290/44 |
| 2007/0216166 A1* | 9/2007 | Schubert | | F03D 7/0224 290/55 |
| 2009/0287335 A1* | 11/2009 | Kobayashi | | C23C 14/34 700/103 |
| 2010/0138201 A1* | 6/2010 | Gundling | | F03D 7/043 703/9 |
| 2010/0138267 A1* | 6/2010 | Vittal | | G05B 23/0283 702/184 |
| 2010/0268849 A1* | 10/2010 | Bengtson | | G05B 15/02 709/248 |
| 2011/0193344 A1* | 8/2011 | Lafferty | | F03D 7/047 290/44 |
| 2011/0213590 A1* | 9/2011 | Middendorf | | F03D 7/042 702/184 |
| 2011/0260907 A1* | 10/2011 | Roche | | G01S 7/415 342/27 |
| 2012/0010755 A1* | 1/2012 | Stapelfeldt | | F03D 7/0284 700/287 |
| 2012/0143537 A1* | 6/2012 | Nielsen | | F03D 7/048 702/60 |
| 2013/0052010 A1* | 2/2013 | Nielsen | | F03D 7/042 416/1 |
| 2013/0098309 A1* | 4/2013 | Nohara | | A01M 29/06 119/713 |
| 2013/0144449 A1* | 6/2013 | Dalsgaard | | F03D 7/048 700/287 |
| 2013/0257641 A1* | 10/2013 | Ronning | | G01S 13/42 342/54 |
| 2013/0280033 A1* | 10/2013 | Babbitt | | A01K 11/006 415/1 |
| 2014/0039843 A1* | 2/2014 | Hazra | | G06F 17/50 703/1 |
| 2014/0070538 A1* | 3/2014 | Bowyer | | F03D 7/0224 290/44 |
| 2014/0261151 A1* | 9/2014 | Ronning | | A01M 29/10 116/22 A |
| 2014/0377061 A1 | 12/2014 | Caruso et al. | | |
| 2015/0010399 A1* | 1/2015 | Bahat | | A01M 29/08 416/1 |
| 2015/0039161 A1* | 2/2015 | Hastings | | A63H 30/02 701/3 |
| 2015/0130618 A1* | 5/2015 | Hamminga | | G01S 7/003 340/573.2 |
| 2015/0204973 A1* | 7/2015 | Nohara | | G01S 13/426 342/107 |
| 2016/0053744 A1* | 2/2016 | Wenger | | A01K 29/005 119/713 |
| 2016/0055399 A1* | 2/2016 | Hiester | | A01K 29/005 382/110 |
| 2016/0055400 A1* | 2/2016 | Jorquera | | F03D 1/06 416/1 |
| 2016/0224836 A1* | 8/2016 | Appel | | G06K 9/6267 |
| 2016/0363652 A1* | 12/2016 | Hamminga | | A01M 31/002 |
| 2017/0101980 A1* | 4/2017 | Wenger | | A01K 29/005 |
| 2017/0186175 A1* | 6/2017 | Kumeno | | G06T 7/60 |
| 2017/0342966 A1* | 11/2017 | Barber | | F03D 9/25 |
| 2018/0075747 A1* | 3/2018 | Pahwa | | B60W 40/09 |
| 2018/0087488 A1* | 3/2018 | Slot | | F03D 7/04 |
| 2018/0128240 A1* | 5/2018 | Freda | | F03D 1/025 |
| 2018/0163700 A1* | 6/2018 | Wenger | | A01K 29/005 |
| 2018/0171972 A1* | 6/2018 | Merz | | F03D 80/10 |
| 2018/0176518 A1* | 6/2018 | Park | | B62D 41/00 |

* cited by examiner

US 10,316,823 B2

WIND TURBINE GROUP CONTROL FOR VOLANT ANIMAL SWARMS

TECHNICAL FIELD

This disclosure relates generally to wind turbine control systems, and more specifically to wind turbine control.

BACKGROUND

A wind turbine is a device that converts the wind's kinetic energy into electrical power. Wind turbines are manufactured in a wide range of vertical and horizontal axis types. Arrays of large turbines, known as wind farms or turbine sites are becoming an increasingly large source of clean renewable energy and are used by many countries as part of a strategy to reduce reliance on fossil fuels while reducing pollution and enhancing the environment of our society. Widespread deployment of wind turbines may have an adverse effect on certain species of volant (flying) animals, such as birds and bats that roost in trees and migrate. In particular, many volant animals collide with wind turbines while generating the clean renewable electric power, resulting in an undesirable volant animal mortality.

SUMMARY

One example includes a method for controlling a plurality of wind turbines at a wind farm. A risk score is defined for each of a plurality of wind turbine groups of the wind farm at a default risk score based on predetermined data. A respective operational parameter is set for each wind turbine of each of the wind turbine groups based on the respective risk score. The presence of a volant animal swarm is detected in a region associated with a given one of the wind turbine groups via a volant animal detection system. The risk score of the given one wind turbine group and an adjacent wind turbine group is changed from the default risk score to temporary risk scores in response to detection of the volant animal swarm.

Another example includes a method for controlling a plurality of wind turbines at a wind farm. The method includes selectively organizing the plurality of wind turbines to a first set of wind turbine groups based on predetermined data and setting a respective operational parameter for each wind turbine of the wind turbine groups based on the assignment of the wind turbines to the respective first set of wind turbine groups. The method also includes tracking motion of a volant animal swarm through the wind farm to determine a pattern of the motion of the volant animal swarm through the wind farm and saving the pattern of the motion of the volant animal swarm through the wind farm in a memory. The method also includes generating a second set of wind turbine groups that is different from the first set of wind turbine groups. The second set of wind turbine groups includes at least one group that corresponds to the saved pattern of motion of volant animal swarms. The method also includes determining that motion of a subsequent volant animal swarm corresponds to the saved pattern of motion of volant animal swarms. The method also includes reorganizing the wind turbine groups from the first set of wind turbine groups to the second set of wind turbine groups in response to determining that the motion of the subsequent volant animal swarm corresponds to the saved pattern of motion of volant animal swarms. The method further includes setting a respective operational parameter for each wind turbine of the wind turbine groups based on the assignment of the wind turbines to the respective second set of wind turbine groups.

Another example includes a method for controlling a plurality of wind turbines at a wind farm. The method includes defining a risk score for each wind turbine of a plurality of groups of wind turbines of the wind farm at a default risk score based on predetermined data. The method also includes organizing the plurality of wind turbines into the plurality of groups based on a proximal relationship of sets of the plurality of wind turbines and based on the risk score associated with the respective plurality of wind turbines and setting a respective operational parameter for each wind turbine of the wind turbine groups based on the respective risk score. The method also includes detecting a volant animal swarm in a region associated with a first one of the wind turbine groups via a volant animal detection system and changing the risk score of the first one of the wind turbine groups and a first adjacent group of the wind turbine groups from the default risk score to temporary risk scores in response to detection of the volant animal swarm. The method also includes detecting the volant animal swarm in a region associated with a second one of the wind turbine groups adjacent to the first one of the wind turbine groups via the volant animal detection system. The method also includes changing the risk score of the second one of the wind turbine groups and a second adjacent group of the wind turbine groups from the default risk score to the temporary risk scores in response to detection of the volant animal swarm. The method further includes restoring the risk score of each group of the wind turbine groups that is not adjacent to the second one of the wind turbine groups from the temporary risk scores to the default risk score after expiration of a predetermined duration of time.

DETAILED DESCRIPTION

Figure 1:
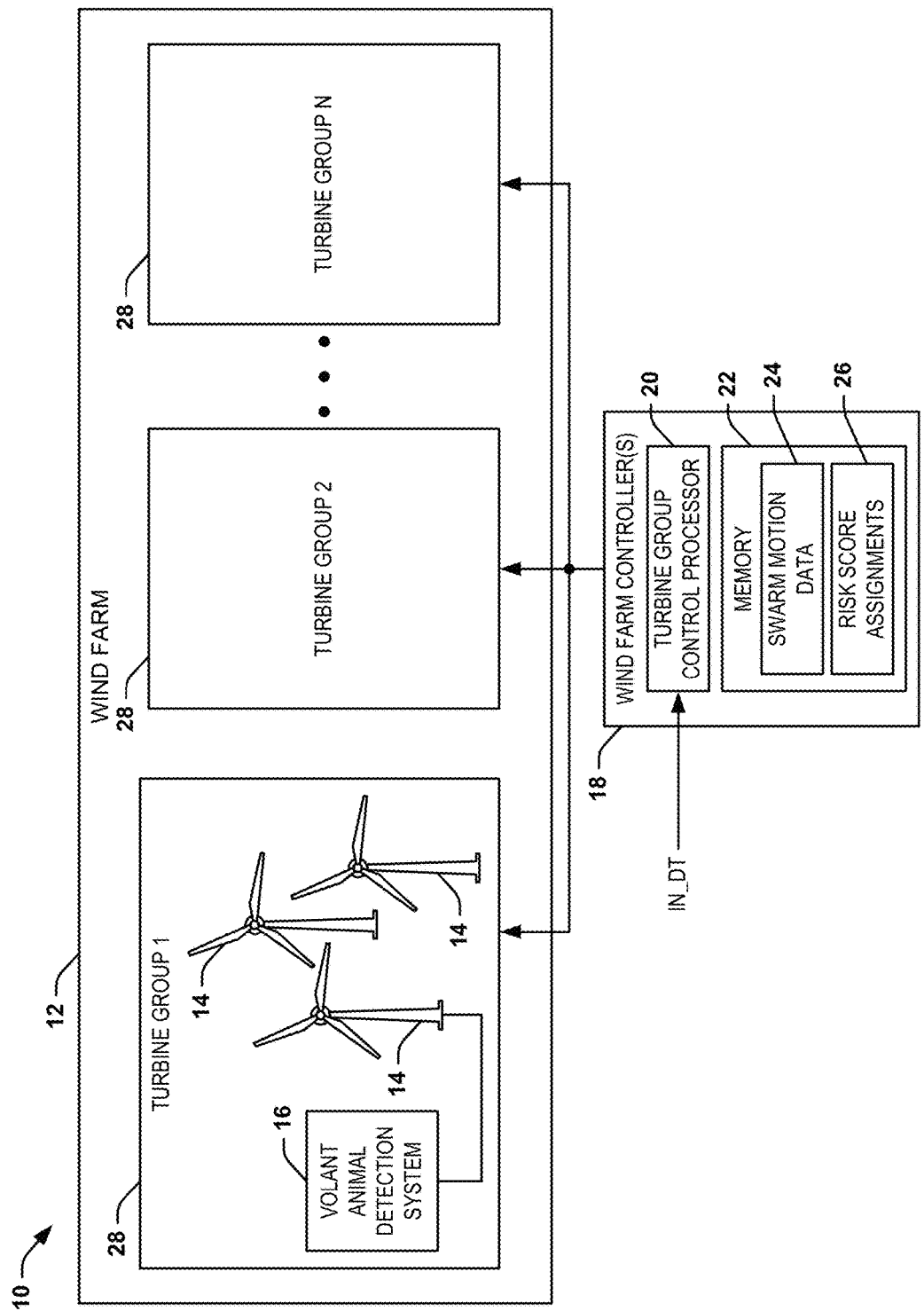
FIG. 1 illustrates an example of a wind turbine control system.

This disclosure relates generally to wind turbine control systems, and more specifically to wind turbine control. A wind farm can include a wind turbine control system and a plurality of wind turbines. The wind turbines can be organized into groups that each has a defined operational parameter, such as associated with curtailment or a cut-in speed for activating the respective wind turbines at a wind speed corresponding to the cut-in speed. The operational parameter can, for example, be defined based on a risk score that can be selectively assigned to each of the wind turbines in a given group. The wind turbines in each group can be initially assigned a default risk score based on predetermined data. For example, the predetermined data can be based on a variety of factors, such as location of the groups; migration, habitat, and behavioral data associated with volant animals (e.g., bats), topographic and environmental data associated with the wind farm; and at least one of calendar date and time of day. Each of the wind turbines in the wind farm can include a volant animal detection system, such as an infrared or ultrasonic detection system to be able to detect bats in the darkness of night.

In response to detection of at least one volant animal via the volant animal detection system, the risk score of each of the wind turbines in a given group can be changed from the default risk score to a temporary risk score. The temporary risk score can be associated with a higher cut-in speed, and can thus be associated with a more cautious operation of the respective wind turbines to mitigate mortality of volant animals that may be flying through the wind farm. In addition, the risk score of each of the groups of wind turbines that are arranged in proximal adjacency to the given group can likewise be changed to a temporary risk score, such as different from the temporary risk score associated with the given group of wind turbines.

In addition, the wind turbine control system can be configured to monitor motion of the volant animal(s) through the wind farm. Such motion of the volant animal(s) can be indicative of an anticipated future pattern of motion of volant animals through the wind farm. In response to monitoring the trajectory of motion of the volant animal(s) through the wind farm, the wind turbine control system can be configured to implement a variety of changes to the control of the wind farm. As a first example, the wind turbine control system can change the default risk score associated with at least one of the groups through which the volant animal(s) flew. As another example, the wind turbine control system can reassign the groupings of the wind turbines. For example, the wind turbine control system can reassign the groups such that one of the groups corresponds to the path through which the volant animal(s) traveled, and thus corresponds to an anticipated future travel path of other volant animals (e.g., of the same species). As another example, the groupings can be changed to create new groups, such that a given one of the wind turbines can belong to more than one group that is controlled in response to volant animals flying into the wind farm from separate portions of the periphery of the wind farm. Accordingly, the creation or modification of groups and/or the assignment of default risk scores can be changed in response to a historical monitoring of the flight trajectory of the volant animals through the wind farm.

FIG. 1 illustrates an example of a wind turbine control system 10. The wind turbine control system 10 can be implemented in any of a variety of wind power applications that includes a wind farm 12, with the wind farm 12 including a plurality of wind turbines 14. Each of the wind turbines 14 can be configured to generate wind power, such as to provide power to a public power grid.

In the example of FIG. 1, each of the wind turbines 14 includes a volant (flying) animal detection system 16 that is configured to detect the presence of a volant animal (e.g., a bat) in proximity to the respective wind turbine 14. For example, the volant animal detection system 16 can be configured to detect volant animals flying in darkness (e.g., at night or in otherwise dark conditions), such as based on infrared or ultrasonic detection. Therefore, the volant animal detection system 16 can detect the presence of a volant animal flying proximal to the respective wind turbine 14, such as to control an operational parameter. As described herein, the term "operational parameter" can be associated with an operational parameter of the wind turbines 14 that is associated with mitigating the likelihood of a fatality of the volant animal. For example, the operational parameter can include curtailing the motion of the wind turbine 14, increasing a cut-in speed of the wind turbine 14, activating a deterrent device, or any of a variety of other parameters to substantially mitigate the likelihood of a fatality of the volant animal. In addition, as described in greater detail herein, the volant animal detection system 16 can be configured to track the motion of volant animals through the wind farm 12 to provide anticipation of aggregate future motion of the volant animals through the wind farm 12, and thus to provide control of the wind turbines 14 in the wind farm 12 based on the anticipated aggregate motion of the volant animals. While the volant animal detection system 16 is demonstrated in the example of FIG. 1 as being associated with a wind turbine 14, or with each of the wind turbines 14, it is to be understood that the volant animal detection system 16 is not limited to having a one-to-one association with the wind turbines 14. As an example, the volant animal detection system 16 can be configured as a distributed sensor system that is independent of the wind turbines 14, and can be distributed throughout the wind farm 12. For example, the volant animal detection system 16 can include stand-alone sensor units, units associated with one or more wind turbines 14, external units that have a field-of-view of the wind farm 12, or any of a combination thereof.

The wind turbine control system 10 also includes at least one wind farm controller 18 that is configured to control the wind turbines 14 of the wind farm 12 in a manner that mitigates mortality of volant animals based on risk scores and historical indicators of volant animal behavior. As an example, the wind farm controller(s) 18 can be singularly located, such as at a single control system associated with the wind farm 12, or can be distributed (e.g., via programmable logic controllers (PLCs) associated with the respective wind turbines 14). As described herein, the risk scores can be associated with an operational parameter associated with the wind turbines 14, such as defining curtailment or a cut-in speed associated with operation of the wind turbines 14. In the example of FIG. 1, the wind farm controller(s) 18 includes a turbine group control processor 20 and a memory 22. The memory 22 is configured to store swarm motion data 24 and risk score assignments 26 that are associated with the wind turbines 14, as described in greater detail herein. The turbine group control processor 20 is configured to organize the wind turbines 14 into wind turbine groups 28, demonstrated in the example of FIG. 1 as a plurality N of groups, where N is a positive integer. As an example, the turbine group control processor 20 can be configured to organize the wind turbines 14 into the wind turbine groups 26 based on the risk scores, and can define the risk score assignments 26 for the respective wind turbine groups 28 based on the swarm motion data 24, as described herein.

As an example, the turbine group control processor 20 can be configured to assign default risk scores to each of the wind turbines 14 in the wind farm 12 based on predetermined data associated with the volant animals and/or the wind farm 12. In the example of FIG. 1, the turbine group control processor 20 is demonstrated as receiving data IN_DT that can correspond to the predetermined data based on which the default risk scores can be assigned as the risk score assignments 24. For example, the default risk scores can be based on a location of each of the respective wind turbines 12 or the wind turbine groups 28; based on migration, habitat, and behavioral data associated with the volant animals; based on topographic and/or environmental data associated with the wind farm 12; and/or based on at least one of calendar date (e.g., season) and time of day.

As an example, the location of each of the respective wind turbines 12 or the wind turbine groups 28 can include proximity to shorelines or woodlands, size and number of proximal woodlands or shorelines, nearby wetlands and/or watercourses. As another example, the migration, habitat, and behavioral data associated with the volant animals can include data associated with known habitat features, known roosts of the volant animals, existing mortality data of the volant animals in the region and/or in the wind farm 12, existing activity data (e.g., migration data) of the volant animals, and/or existing observations of similar or related species of volant animals. As another example, the topographic and/or environmental data associated with the wind farm 12, combined with the season/calendar data information, can include geographic positioning and/or elevation of the wind turbines 14, light sources located on the wind turbines 14, cloud cover and/or moon phase of the region, prevailing wind direction and speed of the region, temperature of the region, weather data associated with the region (e.g., with respect to precipitation and storms), cropland and/or other environmental development in the region, topographic variation, complexity of the land of the region with respect to short and long-term changes, and/or disturbances in the region. The list of factors for assigning the default risk scores of the wind turbines 14 described herein is not intended to be exhaustive, but instead merely describes a variety of different factors that can contribute to variations in the default risk scores that are assigned to the wind turbines 14, and thus saved in the memory 22 as the risk score assignments 26.

Figure 2:
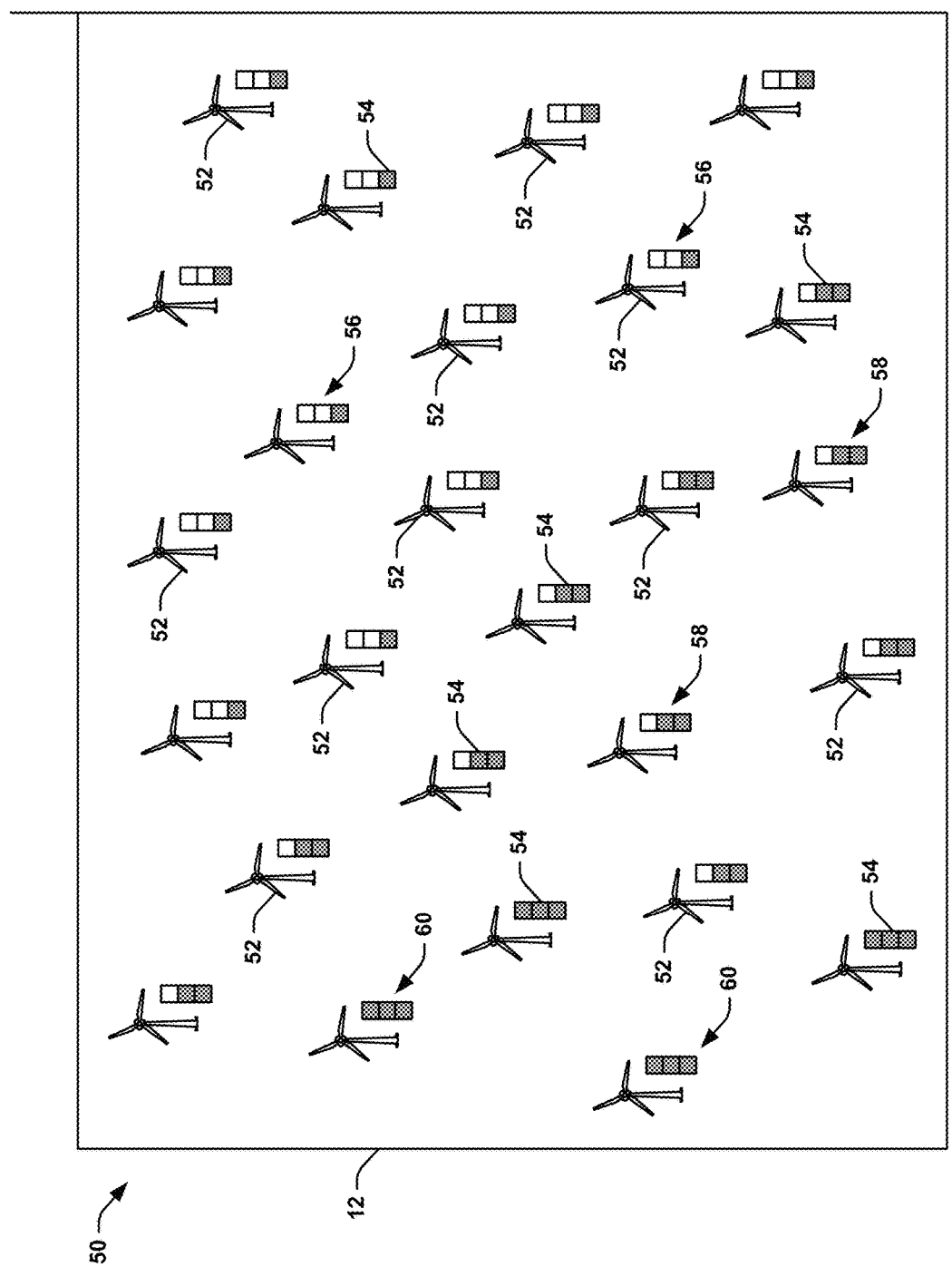
FIG. 2 illustrates an example of a wind farm.

FIG. 2 illustrates an example diagram 50 of a wind farm. The wind farm in the diagram 50 can correspond to the wind farm 12 in the example of FIG. 1. For example, the wind farm 50 includes a plurality of wind turbines 52 that can be controlled by a turbine group control processor (not shown) that can be configure to assign risk scores and organize the wind turbines 52 into groups. Therefore, reference is to be made to the example of FIG. 1 in the following description of the example of FIG. 2.

In the example of FIG. 2, each of the wind turbines 52 in the diagram 50 includes an indication of a risk score 54 that can correspond to a default risk score that is assigned to the respective wind turbines 52. For example, the risk scores 54 can be assigned as default risk scores by the turbine group control processor 20, such as in response to receiving the predetermined data IN_DT. In the example of FIG. 1, the risk scores 54 are demonstrated as level one (e.g., at 56) that indicates a low risk of volant animal mortality, level two (e.g., at 58) that indicates a moderate risk of volant animal mortality, and level three (e.g., at 60) that indicates a high risk of volant animal mortality. As an example, the risk of mortality that is indicated by the risk scores 54 can correspond directly to a cut-in speed associated with the wind turbines 52, such that a lower risk score 54 (e.g., the level one risk score 56) is associated with a low cut-in speed, a moderate risk score (e.g., the level two risk score 58) is associated with a moderate cut-in speed, and a high risk score (e.g., the level three risk score 60) is associated with a high cut-in speed. Accordingly, the default risk scores can be selectively assigned to the wind turbines 52 to control the wind turbines 52 in a manner that can substantially decrease mortality of the volant animals. While the example of FIG. 2, and the following examples of FIGS. 3-11 demonstrate only three separate risk score increments, it is to be understood that there is no limit to the categorization and/or incrementation of the risk scores, as described herein.

Figure 3:
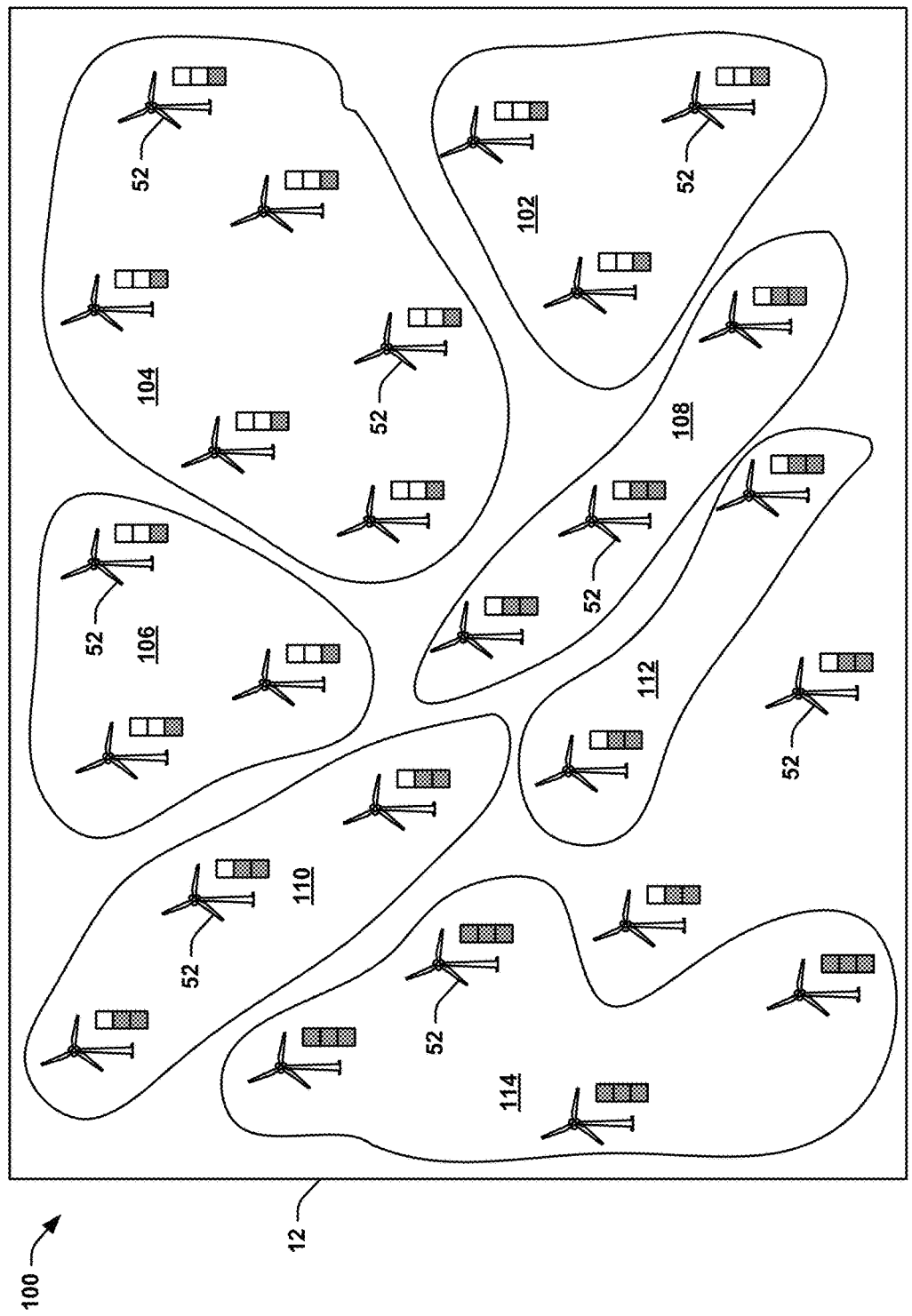
FIG. 3 illustrates an example of a wind farm with wind turbine groups.

FIG. 3 illustrates another example diagram 100 of the wind farm. The wind farm in the diagram 100 includes the wind turbines 52 that can correspond to the wind farm 12 in the example of FIG. 1 and in the diagram 50 in the example of FIG. 2. In the example of FIG. 3, the turbine group control processor 20 has organized the wind turbines 52 into a plurality of groups. The groups include a first group 102, a second group 104, a third group 106, a fourth group 108, a fifth group 110, a sixth group 112, and a seventh group 114. In the example of FIG. 3, the groups 102, 104, 106, 108, 110, 112, and 114 are organized such that each of the wind turbines 52 in each of the groups 102, 104, 106, 108, 110, 112, and 114 has the same risk score 54.

Particularly, the first group 102, the second group 104, and the third group 106 are each demonstrated as having a default risk score of level one. The fourth group 108, the fifth group 110, and the sixth group 112 are demonstrated as having a level two risk score. The seventh group 114 is demonstrated as having a level three risk score. For example, the turbine group control processor 20 can be configured to organize the wind turbines 52 into the respective groups 102 based on a proximal relationship of sets of the wind turbines 52 and based on the respective risk score 54 associated with the wind turbines 52. Therefore, each of the wind turbines 52 can have substantially the same operational parameter (e.g., curtailment or cut-in speed) in each of the groups 102, such that the wind turbines 52 in each of the groups 102 can be controlled substantially the same. The diagram 100 also demonstrates two additional wind turbines 52 that are not part of any of the groups 102, 104, 106, 108, 110, 112, and 114. Therefore, the turbine group control processor 20 can organize the wind turbines 52 such that a given wind turbine 52 can be its own group or not part of any group.

Figure 4:
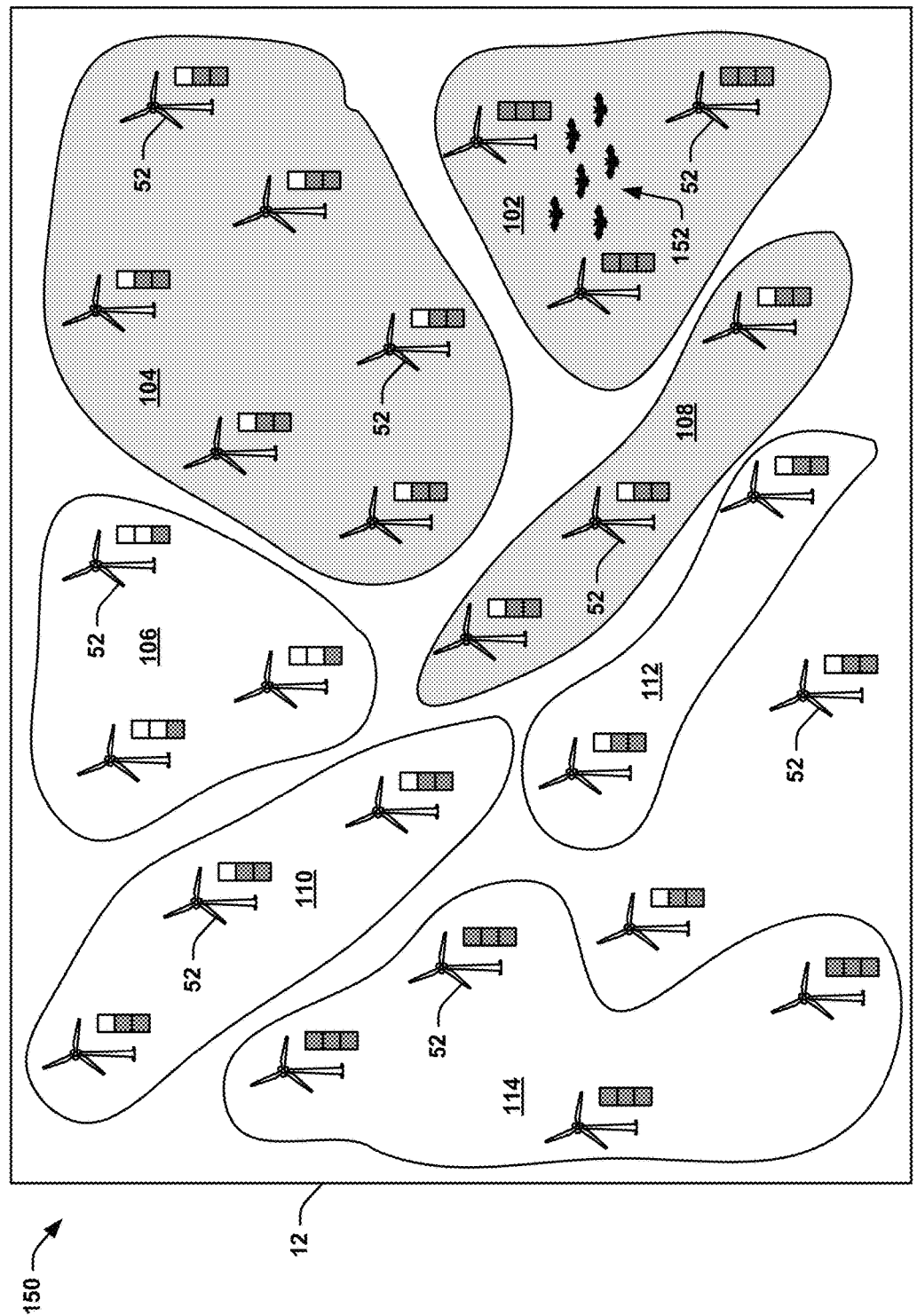
FIG. 4 illustrates an example diagram of detection of volant animals in the wind farm.

FIG. 4 illustrates an example diagram 150 of detection of volant animals in the wind farm. The wind farm in the diagram 150 includes the wind turbines 52 that can correspond to the wind farm 12 in the example of FIG. 1 and in the diagrams 50 and 100 in the respective examples of FIGS. 2 and 3. In the diagram 150, a swarm 152 of volant animals (e.g., bats) is demonstrated as having been detected by the volant animal detection system 16 of at least one of the wind turbines 52 in the first group 102. As described herein, the term "swarm" with respect to the volant animals describes a plurality of the volant animals in flight as a collection (e.g., flock of birds or colony of bats) that exceeds a predetermined threshold, as described in greater detail herein.

As an example, the volant animal detection system 16 associated with each of the wind turbines 52 can be configured to detect the volant animals using threshold techniques. For example, in response to detecting a single volant animal, a given one wind turbine 52 or each wind turbine 52 that detects a volant animal of a given group can implement the operational parameter to avoid a fatality of the individual volant animal(s). However, each wind turbine 52 or the collective wind turbines 52 of a given group can be configured to detect a swarm of the volant animals by comparing a quantity of detected volant animals with a predetermined threshold. For example, the volant animal detection system 16 of one or more of the wind turbines 52 can detect more than one volant animal over a predetermined duration of time, or the volant animal detection system 16 of more than one of the spatially-separated wind turbines 52 can each detect at least one volant animal within a predetermined short duration of time to indicate detection of more than one volant animal. Thus, the threshold detection can be performed based on comparing the estimated number of detected volant animals with the predetermined threshold. In response to the estimated number of detected volant animals being greater than the predetermined threshold, each of the wind turbines 52 in the respective group can increase the respective risk score from the default risk score to a temporary risk score to substantially mitigate the mortality of the volant animals flying through the geographic area associated with the respective group.

In the example of FIG. 4, the wind turbines 52 in the first group 102, highlighted in the example of FIG. 4, can determine the presence of the volant animal swarm 152 (e.g., bats) flying through the geographic area associated with the group 102. For example, as described previously, the volant animal detection system 16 associated with one or more of the wind turbines 52 in the first group 102 can determine the presence of the volant animal swarm 152 based on comparing an estimated (e.g., counted) quantity of volant animals with the predetermined threshold. In response to the estimated quantity of the volant animals exceeding the predetermined threshold, each of the wind turbines 52 in the first group 102 can increase the respective risk score from the default risk score of level one to a temporary risk score of level three to increase the cut-in speed, and thus to mitigate mortality of the volant animals. As an example, the comparison and determination of the presence of the volant animal swarm 152 can be performed by the wind farm controller(s) 18. Therefore, in response to detecting the volant animal swarm 152, the wind farm controller(s) 18 can increase the risk score of the wind turbines 52 in the first group 102 from the default risk score of level one to a temporary risk score of level three. Therefore, even if a given one or more of the wind turbines 52 in the respective first group 102 have not detected any volant animals, the association of the wind turbines 52 in the entire first group 102 can be such that a fatality of the volant animals in the volant animal swarm 152 caused by any of the wind turbines 52 in the first group 102 is less likely.

In addition, it can be uncertain as to the flight trajectory of the volant animal swarm 152, even after having detected the volant animal swarm 152 in the first group 102. Therefore, the wind farm controller(s) 18 can also increase the risk factor of each wind turbine 52 in each group that is adjacent to the detecting group. Therefore, the wind farm controller(s) 18 can exhibit caution in operation of the wind turbines 52 that are more proximal to the detected volant animal swarm 152 to account for multiple scenarios as to the unpredictable flight trajectory of the volant animal swarm 152. In the example of FIG. 4, the second group 104 and the fourth group 108 of wind turbines 52, each also highlighted in the example of FIG. 4, are "adjacent" to the first group 102, in that a given wind turbine 52 in the first group 102 is most proximal to wind turbines 52 in at least one of the second and fourth groups 104 and 108 with respect to wind turbines 52 that are not also in the first group 102. Therefore, the wind farm controller(s) 18 can increase the risk score of the wind turbines 52 in the second and fourth groups 104 and 108 from the default risk score of level one to a temporary risk score of level two. Therefore, the wind farm controller(s) 18 can exhibit caution as to the wind turbines 52 that are proximal to the detected volant animal swarm 152, and could thus be in the unpredictable flight trajectory of the volant animal swarm 152. As a result, the wind turbines 52 in the second and fourth groups 104 and 108 can maintain operation, but in a more cautious manner to mitigate potential fatalities of the volant animals in the volant animal swarm 152.

Figure 5:
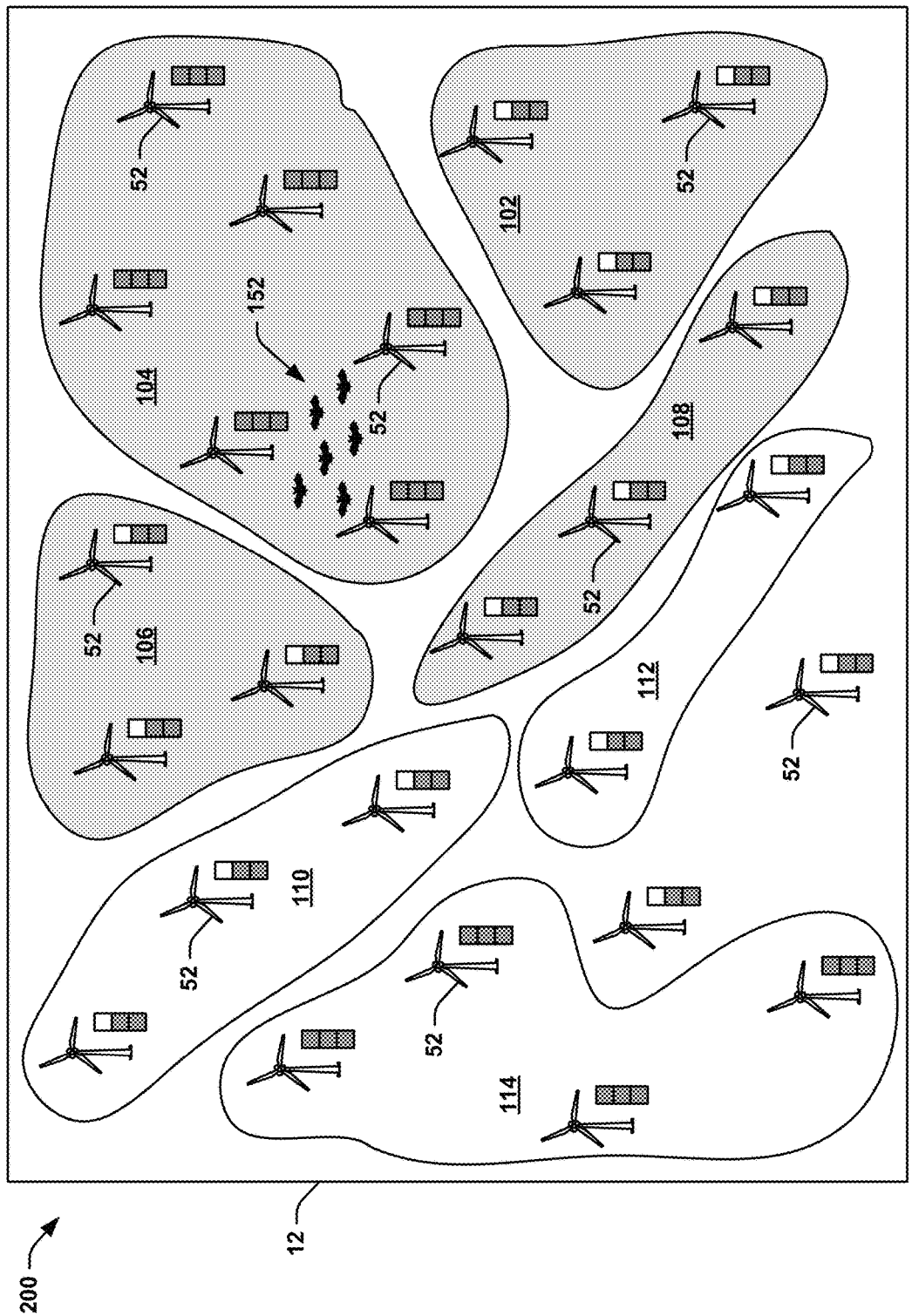
FIG. 5 illustrates another example diagram of detection of volant animals in the wind farm.

FIG. 5 illustrates another example diagram 200 of detection of the volant animal swarm 152 in the wind farm. In the diagram 200, the volant animal swarm 152 (e.g., bats) is demonstrated as having been detected by the volant animal detection system 16 of at least one of the wind turbines 52 in the second group 104, having moved from the region associated with the first group 102.

In the example of FIG. 5, the wind turbines 52 in the second group 104, highlighted in the example of FIG. 5, can determine the presence of the volant animal swarm 152 (e.g., bats) flying through the geographic area associated with the second group 104. For example, as described previously, the volant animal detection system 16 associated with one or more of the wind turbines 52 in the second group 104 can determine the presence of the volant animal swarm 152 based on comparing an estimated (e.g., counted) quantity of volant animals with the predetermined threshold. Therefore, in response to detecting the volant animal swarm 152, the wind farm controller(s) 18 can increase the risk score of the wind turbines 52 in the second group 104 from the temporary risk score of level two to another temporary risk score of level three. Therefore, even if a given one or more of the wind turbines 52 in the respective second group 104 have not detected any volant animals, the association of the wind turbines 52 in the entire second group 104 can be such that a fatality of the volant animals in the volant animal swarm 152 caused by any of the wind turbines 52 in the second group 104 is less likely.

In addition, similar to as described previously, it can be uncertain as to the flight trajectory of the volant animal swarm 152, even after having detected the volant animal swarm 152 in the second group 104. Therefore, in the example of FIG. 5, the first group 102, the third group 106, and the fourth group 108 of wind turbines 52, each also highlighted in the example of FIG. 5, are "adjacent" to the second group 104, in that a given wind turbine 52 in the second group 104 is most proximal to wind turbines 52 in at least one of the first, third, and fourth groups 102, 106, and 108 with respect to wind turbines 52 that are not also in the second group 104. Therefore, the wind farm controller(s) 18 can decrease the risk score of the wind turbines 52 in the first group 102 from the temporary risk score of level three to the temporary risk score of level two, can increase the risk score of the wind turbines 52 in the third group 106 from the default risk score to the temporary risk score of level two, and can maintain the risk score of the wind turbines 52 in the fourth group 108 at the risk score of level two (e.g., changing from the default risk score of level two to the temporary risk score of level two). Therefore, the wind farm controller(s) 18 can exhibit caution as to the wind turbines 52 that are proximal to the detected volant animal swarm 152, and could thus be in the unpredictable flight trajectory of the volant animal swarm 152. As a result, the wind turbines 52 in the first, third, and fourth groups 102, 106, and 108 can maintain operation, but in a more cautious manner to mitigate potential fatalities of the volant animals in the volant animal swarm 152.

Figure 6:
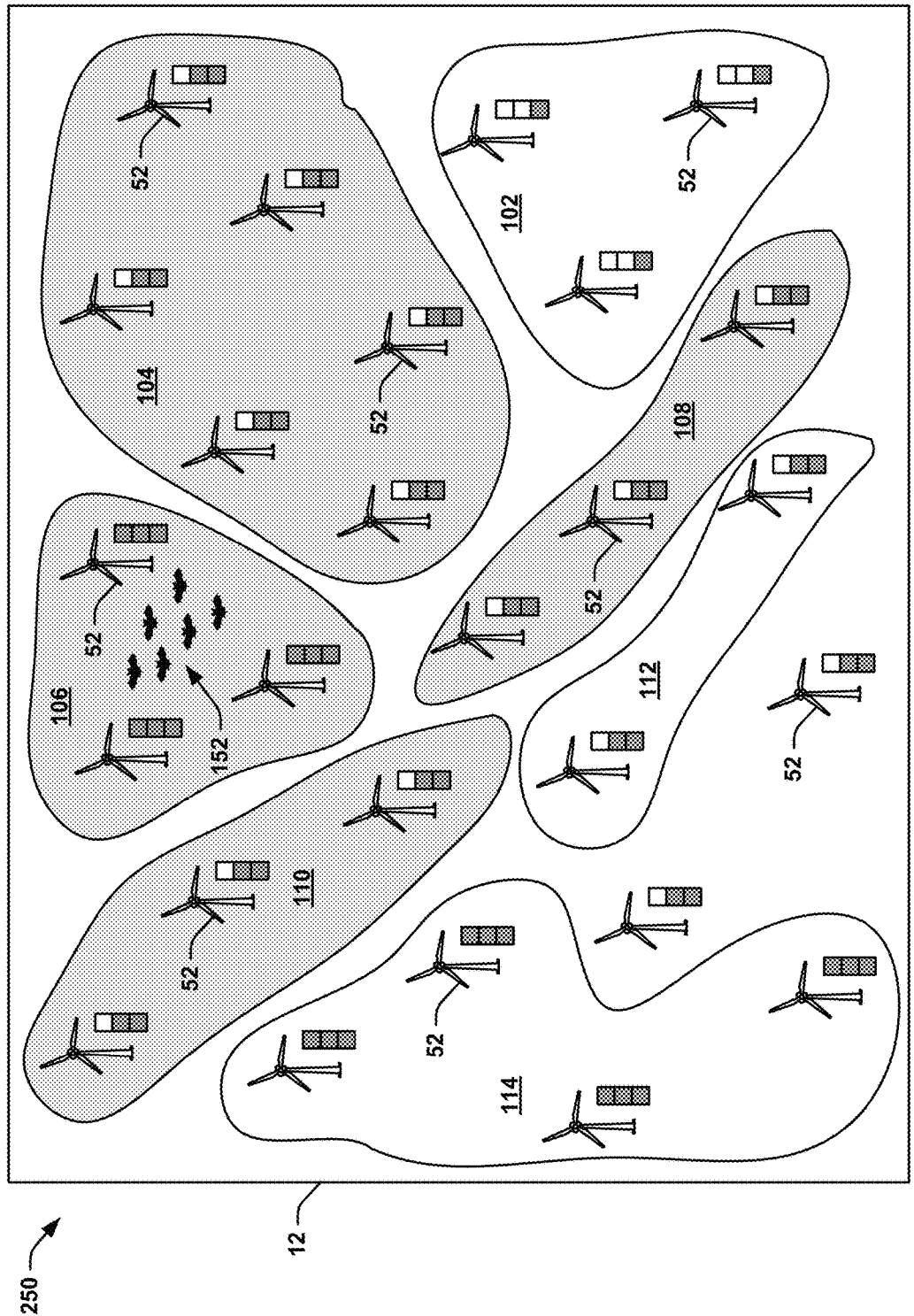
FIG. 6 illustrates yet another example diagram of detection of volant animals in the wind farm.

FIG. 6 illustrates yet another example diagram 250 of detection of the volant animal swarm 152 in the wind farm. In the diagram 250, the volant animal swarm 152 (e.g., bats) is demonstrated as having been detected by the volant animal detection system 16 of at least one of the wind turbines 52 in the third group 106, having moved from the region associated with the second group 104.

In the example of FIG. 6, the wind turbines 52 in the third group 106, highlighted in the example of FIG. 6, can determine the presence of the volant animal swarm 152 (e.g., bats) flying through the geographic area associated with the third group 106. For example, as described previously, the volant animal detection system 16 associated with one or more of the wind turbines 52 in the third group 106 can determine the presence of the volant animal swarm 152 based on comparing an estimated (e.g., counted) quantity of volant animals with the predetermined threshold. Therefore, in response to detecting the volant animal swarm 152, the wind farm controller(s) 18 can increase the risk score of the wind turbines 52 in the third group 106 from the temporary risk score of level two to another temporary risk score of level three. Therefore, even if a given one or more of the wind turbines 52 in the respective third group 106 have not detected any volant animals, the association of the wind turbines 52 in the entire third group 106 can be such that a fatality of the volant animals in the volant animal swarm 152 caused by any of the wind turbines 52 in the third group 106 is less likely.

In addition, similar to as described previously, it can be uncertain as to the flight trajectory of the volant animal swarm 152, even after having detected the volant animal swarm 152 in the third group 106. Therefore, in the example of FIG. 6, the second group 104, and the fourth group 108 of wind turbines 52, and the fifth group 110, each also highlighted in the example of FIG. 6, are "adjacent" to the third group 106, in that a given wind turbine 52 in the third group 106 is most proximal to wind turbines 52 in at least one of the second, fourth, and fifth groups 104, 108, and 110 with respect to wind turbines 52 that are not also in the third group 106. Therefore, the wind farm controller(s) 18 can decrease the risk score of the wind turbines 52 in the second group 104 from the temporary risk score of level three to the temporary risk score of level two, and can maintain the risk score of the wind turbines 52 in the fourth and fifth groups 108 and 110 at the temporary risk score of level two (e.g., changing from the default risk score of level two to the temporary risk score of level two). Therefore, the wind farm controller(s) 18 can exhibit caution as to the wind turbines 52 that are proximal to the detected volant animal swarm 152, and could thus be in the unpredictable flight trajectory of the volant animal swarm 152. As a result, the wind turbines 52 in the second, fourth, and fifth groups 104, 108, and 110 can maintain operation, but in a more cautious manner to mitigate potential fatalities of the volant animals in the volant animal swarm 152.

In addition, in the example of FIG. 6, in response to the volant animal swarm 152 moving from the second group 104 to the third group 106, the first group 102 is no longer adjacent to the group in which the volant animal swarm 152 is detected. As a result, the wind farm controller(s) 18 can determine that the volant animals are no longer passing through the first group 102, such that the first group 102 can resume normal operation. Therefore, the wind farm controller(s) 18 can decrease the risk score of the wind turbines 52 in the first group 102 from the temporary risk score of level two to the default risk score of level one. As an example, the wind farm controller(s) 18 can wait until expiration of a predetermined duration of time before changing the risk score from the temporary risk score to the default risk score. Alternatively, in the example of FIG. 6, the wind farm controller(s) 18 can be configured to maintain the temporary risk score until the volant animal swarm 152 has left the wind farm 12, and is thus no longer detected by any of the volant animal detection systems 16 associated with any of the respective wind turbines 14 in the wind farm 12. Accordingly, the first group 102 can be maintained in a more cautious state in the event that other volant animals begin to move through the wind farm 12. In either example, eventually, the wind farm controller(s) 18 can return each of the groups 102, 104, 106, 108, 110, 112, and 114 to the default risk scores after the volant animal swarm 152 has left the wind farm 12 (e.g., after a predetermined duration of time). Accordingly, the wind farm 12 can remove the mitigation, which can substantially maximize energy generating revenue while maintaining a safer environment for the volant animals in the area.

In addition to reacting to the presence of the volant animal swarm 152 in real-time, the wind farm 12 can be configured to modify operating behavior in response to historical movement of volant animals through the wind farm 12. For example, as described in greater detail herein, the turbine group control processor 20 can be configured to reorganize the groups of wind turbines 52 in the wind farm 12. As another example, the turbine group control processor 20 can be configured to redefine the default risk scores for each of the wind turbines 52 in the wind farm 12, and thus for each of the defined groups of wind turbines 52. As yet another example, the turbine group control processor 20 can be configured to implement reorganization and redefinition of the groups and the risk factors based on historical tracking of swarms of volant animals through the wind farm 12, such as can be stored as the swarm motion data 24 in the memory 22.

As an example, the volant animal detection system 16 associated with the respective wind turbines 54 can be configured to track motion associated with one or more volant animal swarms 152 to determine a pattern of motion of volant animal swarms through the wind farm 12, which can be stored as the swarm motion data 24 in the memory 22. The swarm motion data 24 can also have additional data saved with it, such as different selective organization of the wind turbine groups 28 and/or different sets of default risk scores for the wind turbine groups 28. Therefore, in response to a subsequent one or more volant animal swarms 152 flying through the wind farm 12, the wind farm controller 18 can identify that the motion of the subsequent volant animal swarm 152 is flying according to one of the saved patterns of motion. Therefore, the data associated with the saved pattern of motion can be accessed from the swarm motion data 24, such that the wind farm controller 18 can reorganize the wind farm groups 28 and/or redefine the risk scores of the wind farm groups 28 to better control the wind farm 12 in response to the repeated pattern of motion of the subsequent volant animal swarms.

Figure 7:
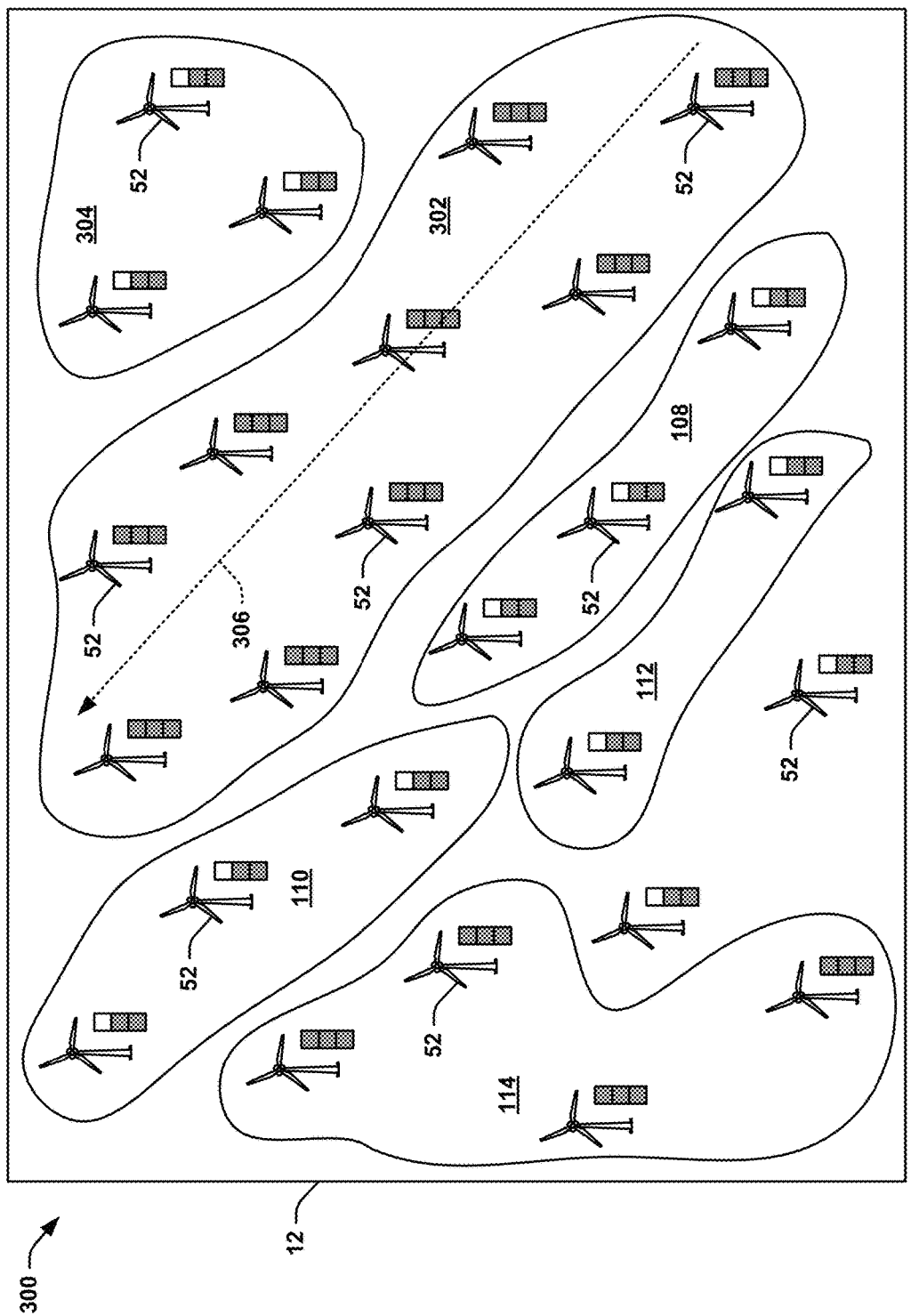
FIG. 7 illustrates another example of a wind farm with wind turbine groups.

FIG. 7 illustrates another example diagram 300 of the wind farm. The wind farm in the diagram 300 includes the wind turbines 52 that can correspond to the wind farm 12 in the example of FIG. 1 and in the diagrams 50, 100, 150, 200, and 250 in the respective examples of FIGS. 2-6. In the example of FIG. 7, the turbine group control processor 20 has reorganized the wind turbines 52 into a different plurality of groups relative to the groups 102, 104, 106, 108, 110, 112, and 114 in the diagrams 50, 100, 150, 200, and 250. Particularly, in the example of FIG. 7, the former groups 102, 104, and 106 have been reorganized into two groups, demonstrated as a first group 302 and a second group 304, respectively. As an example, in response to detecting the volant animal swarm 152 moving through the wind farm 12 in the flight trajectory indicated by the dotted line 306, the turbine group control processor 20 can be configured to reorganize the groups such that the new first group 302 corresponds to a single group associated with the region of the wind farm 12 along the flight trajectory 306. Accordingly, the new first group 302 can correspond to anticipated future patterns of movement of the volant animals through the wind farm 12.

For example, the turbine group control processor 20 can reorganize the groups based on counting numerous flights of volant animal swarms 152, such as corresponding to a seasonal migration or seasonal activity of the volant animals, and reorganizing the groups to create the new first and second groups 302 and 304 in response to the number of swarms exceeding a predetermined threshold. As another example, the reorganization of the groups in the diagram 300 can be a temporary reorganization of groups based on detecting one or more subsequent volant animal swarms 152, such as to better accommodate the safety of the volant animals as they fly through the wind farm 12. For example, the wind farm controller 18 can identify that a subsequent one or more volant animal swarms corresponds to a saved pattern of motion, and can therefore access the pattern of motion and associated organization of wind farm groups from the swarm motion data 24 in the memory 22.

The new first group 302 can thus be set to have a default risk score of level three, in the example of FIG. 7, to correspond to anticipated future patterns of movement of volant animals through the wind farm 12. In addition, the new second group 304 can be defined as having a default risk score of level two to indicate a moderate risk of volant animal activity through the new second group 304 based on proximity of the new second group 304 to the new first group 302. Furthermore, the previous fourth and fifth groups 108 and 110 can maintain the default risk score of level two to indicate a moderate risk of volant animal activity through the respective groups 108 and 110 based on proximity to the new first group 302. As an example, the reorganization of the groups of the wind farm 12 can be indefinite, or can be defined for specific times of the day or specific times of the year, such as based on predetermined data associated with the region or the volant animals (e.g., such as based on the predetermined data IN_DT). Accordingly, the turbine group control processor 20 can be reactive to the activity of the volant animals to better refine the operational parameters of the wind turbines 52 of the wind farm 12, and thus to maximize energy-generation revenue while substantially reducing mortality of the volant animals.

Figure 8:
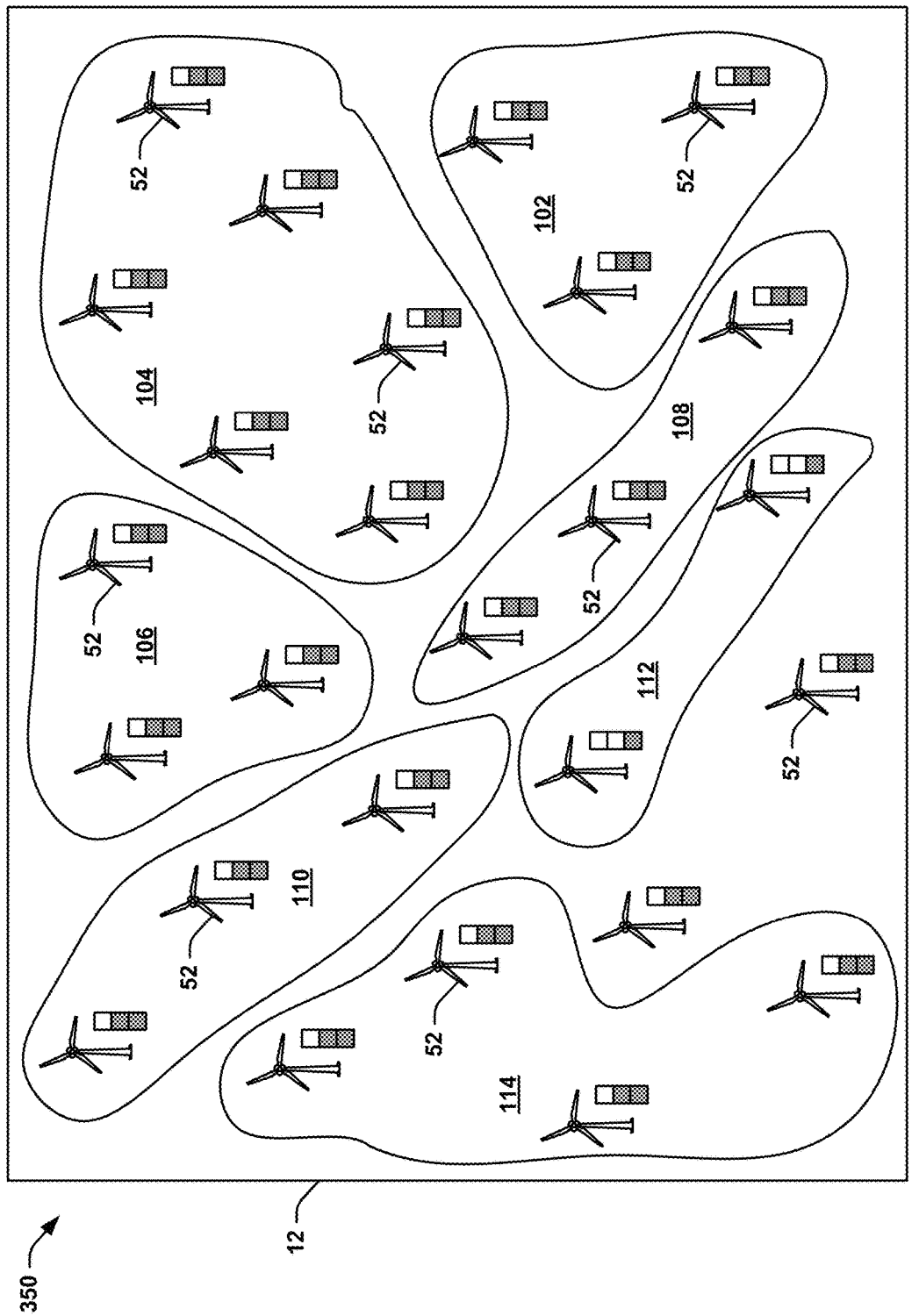
FIG. 8 illustrates yet another example of a wind farm with wind turbine groups.

FIG. 8 illustrates another example diagram 350 of the wind farm. The wind farm in the diagram 350 includes the wind turbines 52 that can correspond to the wind farm 12 in the example of FIG. 1 and in the diagrams 50, 100, 150, 200, 250, and 300 in the respective examples of FIGS. 2-7. In the example of FIG. 8, the turbine group control processor 20 has maintained the organization of the wind turbines 52 in the groups 102, 104, 106, 108, 110, 112, and 114. However, the turbine group control processor 20 has redefined the default risk scores of the wind turbines 52 in the first group 102, the second group 104, and the third group 106. Particularly, in the example of FIG. 8, the groups 102, 104, and 106 have had the respective default risk scores increased from level one to level two. As an example, in response to detecting the volant animal swarm 152 moving through the wind farm 12 through the respective groups 102, 104, and 106, the turbine group control processor 20 can be configured to redefine the default risk scores at the increased default risk score of level two, relative to the prior default risk score of level one. Accordingly, the new risk scores of the groups 102, 104, and 106 can correspond to anticipated future patterns of movement of the volant animals through the wind farm 12.

For example, the turbine group control processor 20 can change the default risk scores of the groups based on counting numerous flights of swarms 152, such as corresponding to a seasonal migration or seasonal activity of the volant animals, and thus changing (e.g., increasing) the risk scores of the groups in response to the number of swarms exceeding a predetermined threshold. As another example, the change of the default risk scores of the groups in the diagram 350 can be a temporary change to the default risk scores based on detecting one or more subsequent volant animal swarms 152, or based on a specific time of day or season, such as to better accommodate the safety of the volant animals as they fly through the wind farm 12. For example, the wind farm controller 18 can identify that a subsequent one or more volant animal swarms corresponds to a saved pattern of motion, and can therefore access the pattern of motion and associated risk score data from the swarm motion data 24 in the memory 22.

In addition, the turbine group control processor 20 can decrease the risk score of other groups that have not had any volant animal activity. In the example of FIG. 8, the sixth group 112 is demonstrated as having a default risk score that is decreased from level two to level one, and the seventh group 114 is demonstrated as having a default risk score that is decreased from level three to level two. For example, the turbine group control processor 20 can decrease the default risk scores in response to a lack of activity of the volant animals (e.g., no individual volant animal or swarm detection for a predetermined time duration). As an example, the redefining of the default risk scores of the groups of the wind farm 12 can be indefinite, or can be defined for specific times of the day or specific times of the year, such as based on predetermined data associated with the region or the volant animals (e.g., such as based on the predetermined data IN_DT). Accordingly, the turbine group control processor 20 can be reactive to the activity of the volant animals to better refine the operational parameters of the wind turbines 52 of the wind farm 12, and thus to maximize energy-generation revenue while substantially reducing mortality of the volant animals.

As described earlier, the turbine group control processor 20 can reorganize the groups of the wind farm 12 and/or can redefine the default risk scores of the wind turbines in the respective groups. In addition, as an example, based on multiple points of ingress or egress of the swarms of the volant animals through the wind farm 12, it may be necessary to define the groups of the wind turbines 52 in a manner that the groups overlap. For example, the overlapping groups can be such that a given one or more wind turbines 52 can be assigned to at least two separate groups of the plurality of groups of the wind farm 12. As a result, the behavior of the groups can be more flexible with respect to detection of the swarm of volant animals.

Figure 9:
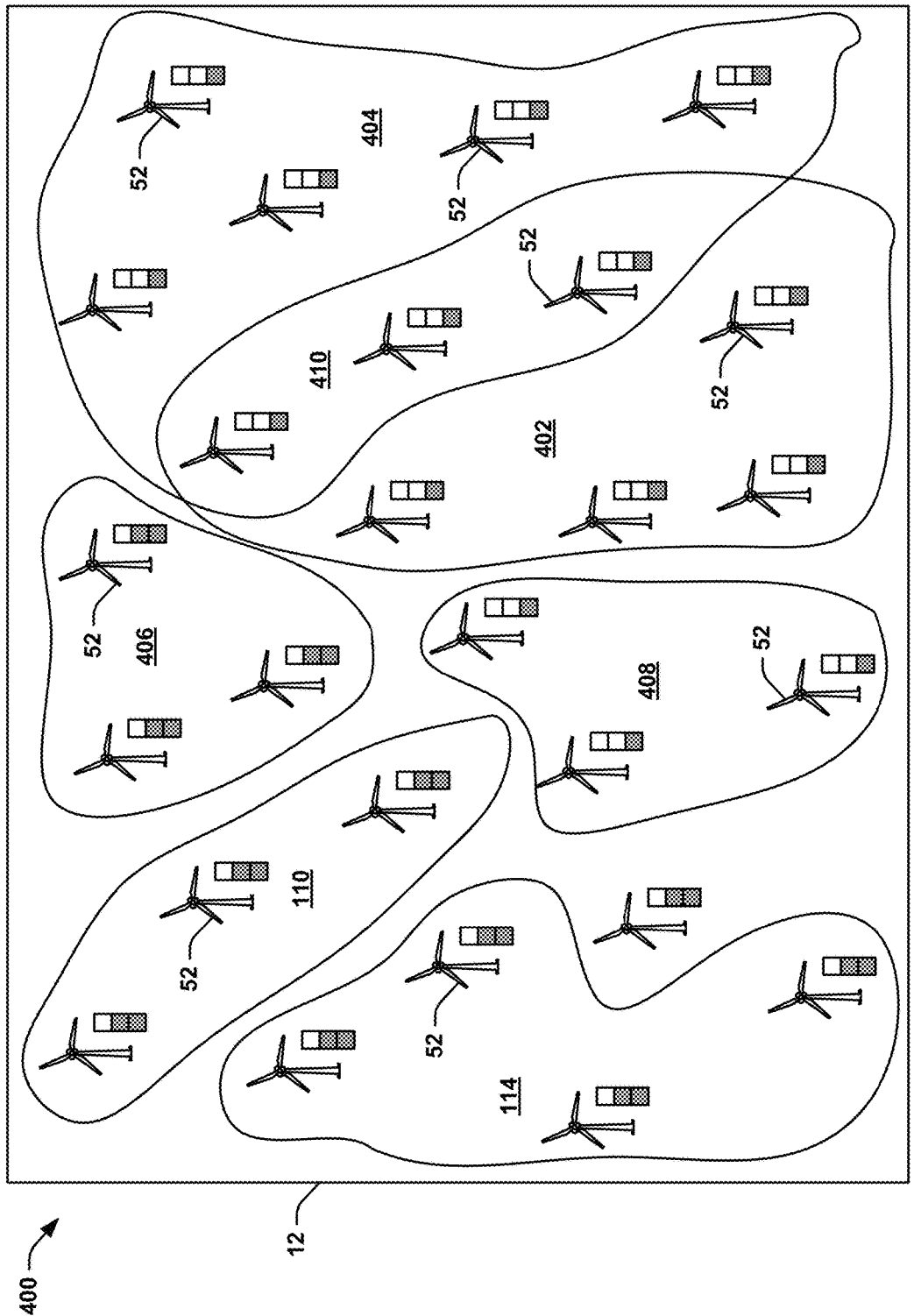
FIG. 9 illustrates yet a further example of a wind farm with wind turbine groups.

FIG. 9 illustrates another example diagram 400 of the wind farm. The wind farm in the diagram 400 includes the wind turbines 52 that can correspond to the wind farm 12 in the example of FIG. 1 and in the diagrams 50, 100, 150, 200, and 250 in the respective examples of FIGS. 2-6. In the example of FIG. 9, the turbine group control processor 20 has organized the wind turbines 52 into a different plurality of groups relative to the groups 102, 104, 106, 108, 110, 112, and 114 in the diagrams 50, 100, 150, 200, and 250. Particularly, in the example of FIG. 9, the former groups 102, 104, 106, 108, and 110 have been reorganized into four groups, demonstrated as a first group 402, a second group 404, a third group 406, and a fourth group 408. In the example of FIG. 9, the first and second groups 402 and 404 are demonstrated as having an overlapping region 410, in which three of the wind turbines 52 in the overlapping region 410 belong to both the first group 402 and the second group 404. Additionally, the groups 402, 404, and 408 are demonstrated as having a default risk score of level one, and the groups 406, 112, and 114 are demonstrated as having a default risk score of level two.

As an example, the grouping of the wind turbines 52 as the groups 402, 404, 406, 408, 112, and 114 can be an initial grouping. As another example, the reorganization of the groups in the diagram 300 can be a temporary reorganization of groups based on detecting one or more subsequent volant animal swarms 152, such as to better accommodate the safety of the volant animals as they fly through the wind farm 12, similar to as described previously in the example of FIG. 7. For example, the wind farm controller 18 can identify that a subsequent one or more volant animal swarms corresponds to a saved pattern of motion, and can therefore access the pattern of motion and associated organization of wind farm groups from the swarm motion data 24 in the memory 22. As described in greater detail herein, the organization of the wind turbine groups in the example of FIG. 9 can be suitable to accommodate more than one pattern of motion of volant animal swarms.

Figure 10:
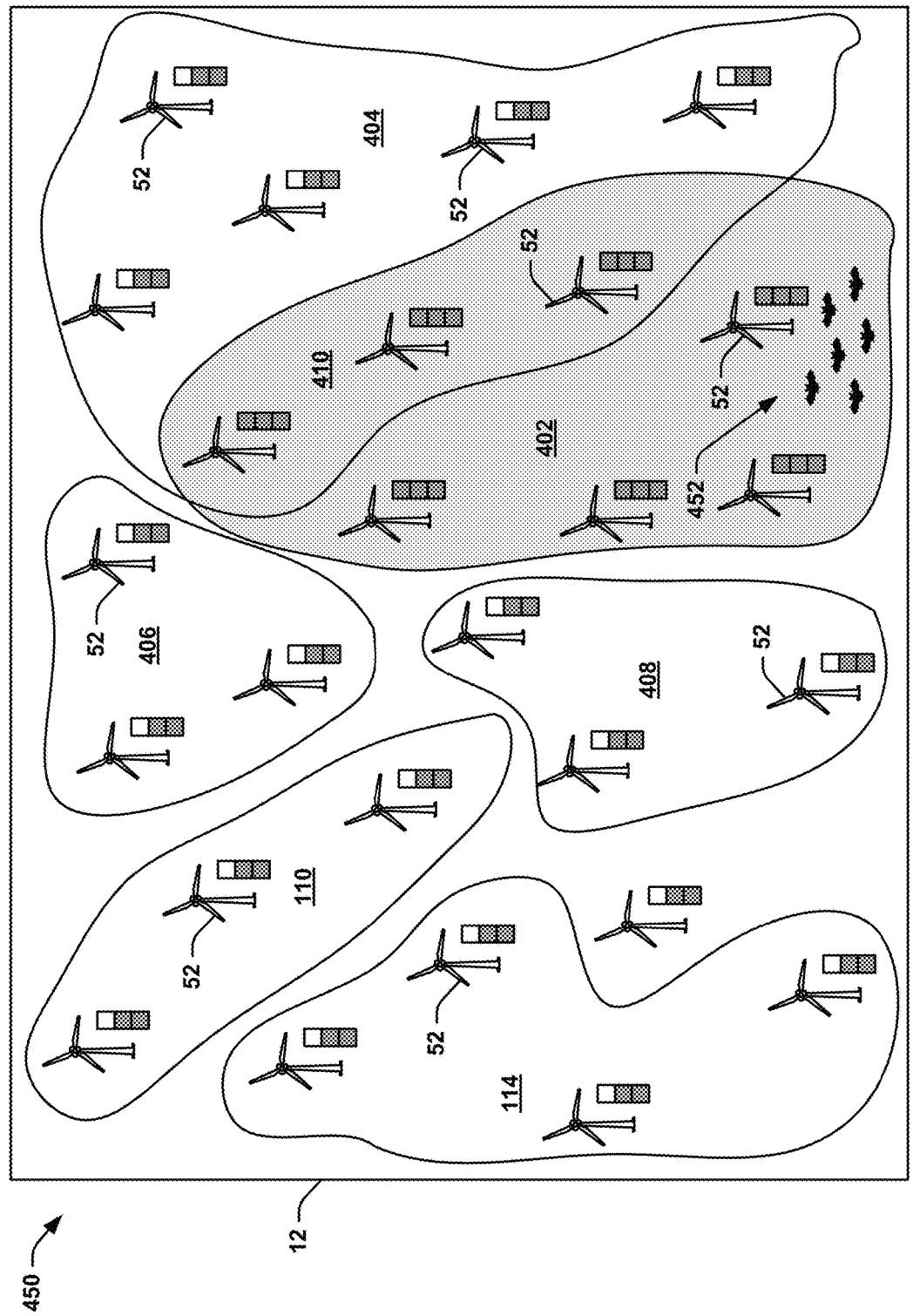
FIG. 10 illustrates yet another example diagram of detection of volant animals in the wind farm.

FIG. 10 illustrates yet another example diagram 450 of detection of volant animals in the wind farm 12. The wind farm in the diagram 150 includes the wind turbines 52 that can correspond to the wind farm 12 in the example of FIG. 1 and in the diagram 400 in the respective example of FIG. 9. In the diagram 450, a swarm 452 of volant animals (e.g., bats) is demonstrated as having been detected by the volant animal detection system 16 of at least one of the wind turbines 52 in the first group 402. As an example, the detection of the swarm 452 can be performed in a substantially similar manner as that described previously in the example of FIG. 4.

In the example of FIG. 10, the wind turbines 52 in the first group 402, highlighted in the example of FIG. 10, can determine the presence of the volant animal swarm 452 (e.g., bats) flying through the geographic area associated with the group 402. In response to detecting the volant animal swarm 452, the wind farm controller(s) 18 can increase the respective risk score of each of the wind turbines 52 in the first group 402 from the default risk score of level one to the temporary risk score of level three to increase the cut-in speed, and thus to mitigate mortality of the volant animals, similar to as described previously in the example of FIG. 4. In addition, the wind farm controller(s) 18 can also increase the risk factor of each wind turbine 52 in each group that is adjacent to the detecting group. In the example of FIG. 4, the second group 404, the third group 406, and the fourth group 408 are adjacent to the first group 402. Therefore, the wind farm controller(s) 18 can increase the risk score of the wind turbines 52 in the second group 404 that are not in the overlapping region 410, and thus not also in the first group 402, from the default risk score of level one to the temporary risk score of level two. Additionally, the wind controller(s) 18 can increase the risk score of the wind turbines 52 in the third group 406 from the default risk score of level one to the temporary risk score of level two, and can maintain the risk score of the fourth group 408 at the risk score of level two. Therefore, the wind farm controller(s) 18 can exhibit caution as to the wind turbines 52 that are proximal to the detected swarm 452, and could thus be in the unpredictable flight trajectory of the swarm 452.

Figure 11:
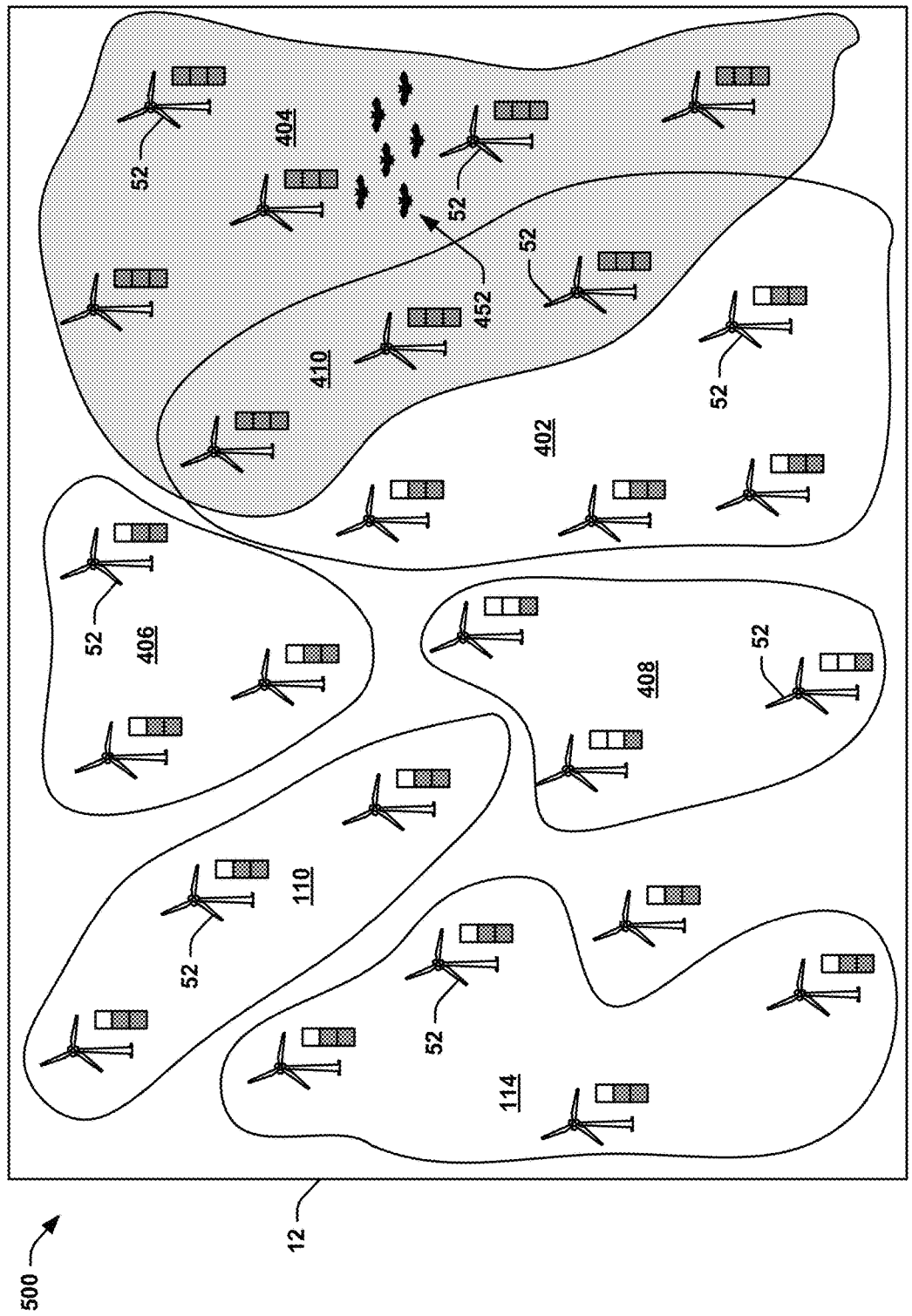
FIG. 11 illustrates yet a further example diagram of detection of volant animals in the wind farm.

FIG. 11 illustrates yet another example diagram 500 of detection of the volant animal swarm 452 in the wind farm. In the diagram 500, the swarm 452 of volant animals is demonstrated as having been detected by the volant animal detection system 16 of at least one of the wind turbines 52 in the second group 404, having moved from the region associated with the first group 402.

In the example of FIG. 11, the wind turbines 52 in the second group 404, highlighted in the example of FIG. 11, can determine the presence of the volant animal swarm 452 flying through the geographic area associated with the second group 404. Therefore, in response to detecting the swarm 452, the wind farm controller(s) 18 can increase the risk score of the wind turbines 52 in the second group 404 from the temporary risk score of level two to another temporary risk score of level three. In addition, similar to as described previously, it can be uncertain as to the flight trajectory of the volant animal swarm 452, even after having detected the swarm 452 in the second group 404. Therefore, in the example of FIG. 11, the first group 402 and the third group 406 are adjacent to the second group 404. Therefore, the wind farm controller(s) 18 can decrease the risk score of the wind turbines 52 in the first group 402 that are not in the overlapping region 410, and thus not also in the second group 404, from the temporary risk score of level three to the temporary risk score of level two. The wind farm controller(s) 18 can also maintain the risk score of the wind turbines 52 in the third group 406 at the risk score of level two (e.g., changing from the default risk score of level two to the temporary risk score of level two). Therefore, the wind farm controller(s) 18 can exhibit caution as to the wind turbines 52 that are proximal to the detected swarm 452, and could thus be in the unpredictable flight trajectory of the swarm 452.

In addition, in the example of FIG. 11, in response to the volant animal swarm 452 moving from the first group 402 to the second group 404, the fourth group 408 is no longer adjacent to the group in which the swarm 452 is detected. As a result, the wind farm controller(s) 18 can determine that the volant animals are no longer passing through the fourth group 408, such that the fourth group 408 can resume normal operation. Therefore, the wind farm controller(s) 18 can decrease the risk score of the wind turbines 52 in the first group 102 from the temporary risk score of level two to the default risk score of level one, similar to as described previously in the example of FIG. 6. As an example, the wind farm controller(s) 18 can wait until expiration of a predetermined duration of time before changing the risk score from the temporary risk score to the default risk score. Accordingly, the wind farm 12 can begin to operate normally again to substantially maximize energy generating revenue while maintaining a safer environment for the volant animals in the area.

Based on the overlapping arrangement of the groups 402 and 404, the diagrams 400, 450, and 500 demonstrate that the overlapping wind turbine groups can accommodate patterns of motion of volant animal swarms with multiple different points of ingress or egress the swarms of the volant animals through the wind farm 12. For example, the operation of the wind farm 12 would be substantially the same if the volant animal swarm 452 enters the wind turbine group 404 first. In this example, the risk score changes from the default risk scores to the temporary risk scores would occur in reverse order, but the operation could otherwise be substantially the same with the same wind turbine groups. As a result, the behavior of the wind turbine groups can be more flexible with respect to detection of the swarms of volant animals.

What has been described are mere examples of the organization of the wind farm 12 in the respective groups of wind turbines and the definition of the default and temporary risk scores in response to detection of a swarm of volant animals. Therefore, the organization of the wind farm 12 in the respective groups of wind turbines and the definition of the default and temporary risk scores in response to detection of a swarm of volant animals is not limited to as described herein. Accordingly, many more different combinations and variations of organization and risk score definition can be achieved based on the control scheme described herein.

Figure 12:
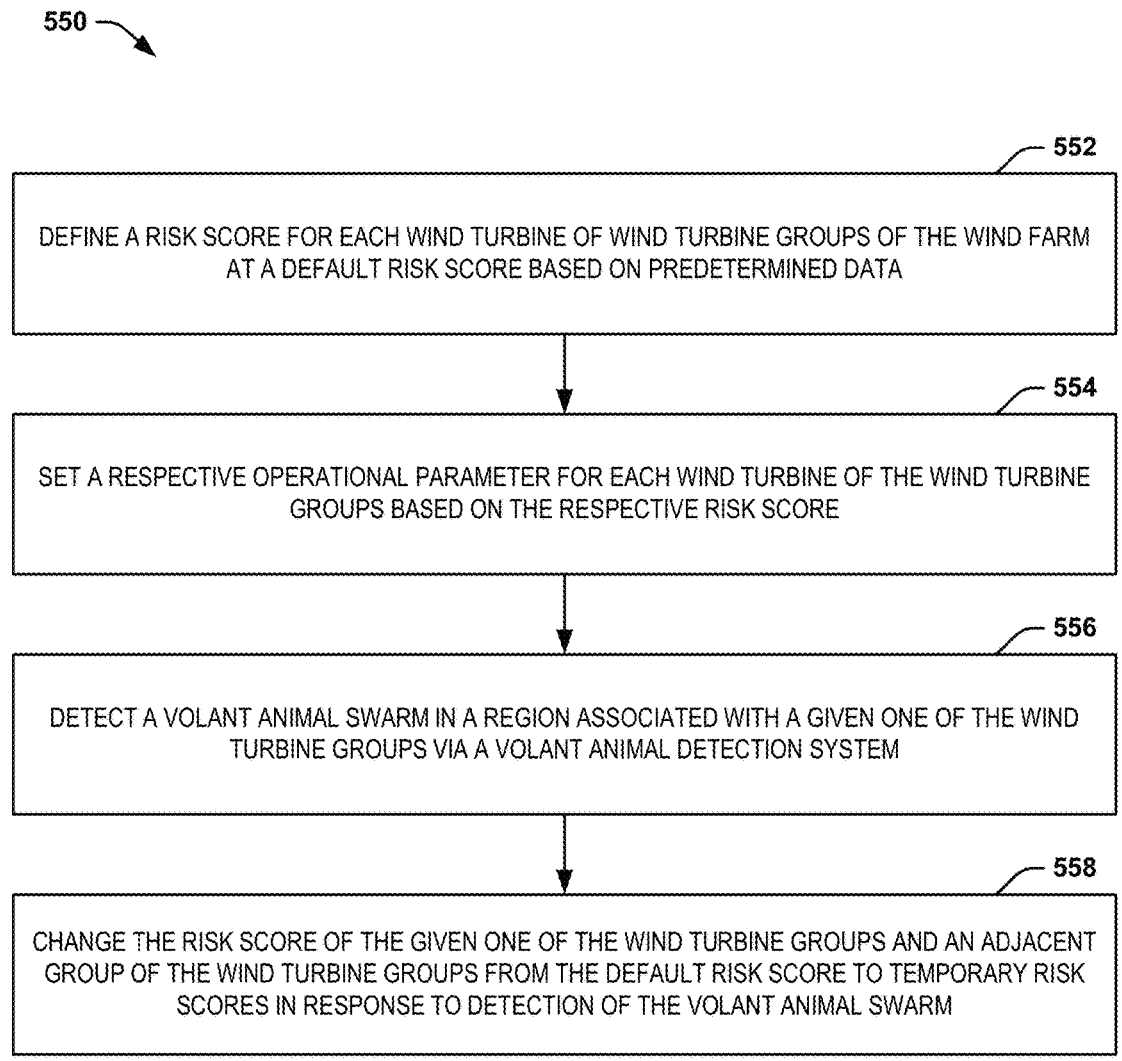
FIG. 12 illustrates an example of a method for controlling a wind farm.
Figure 13:
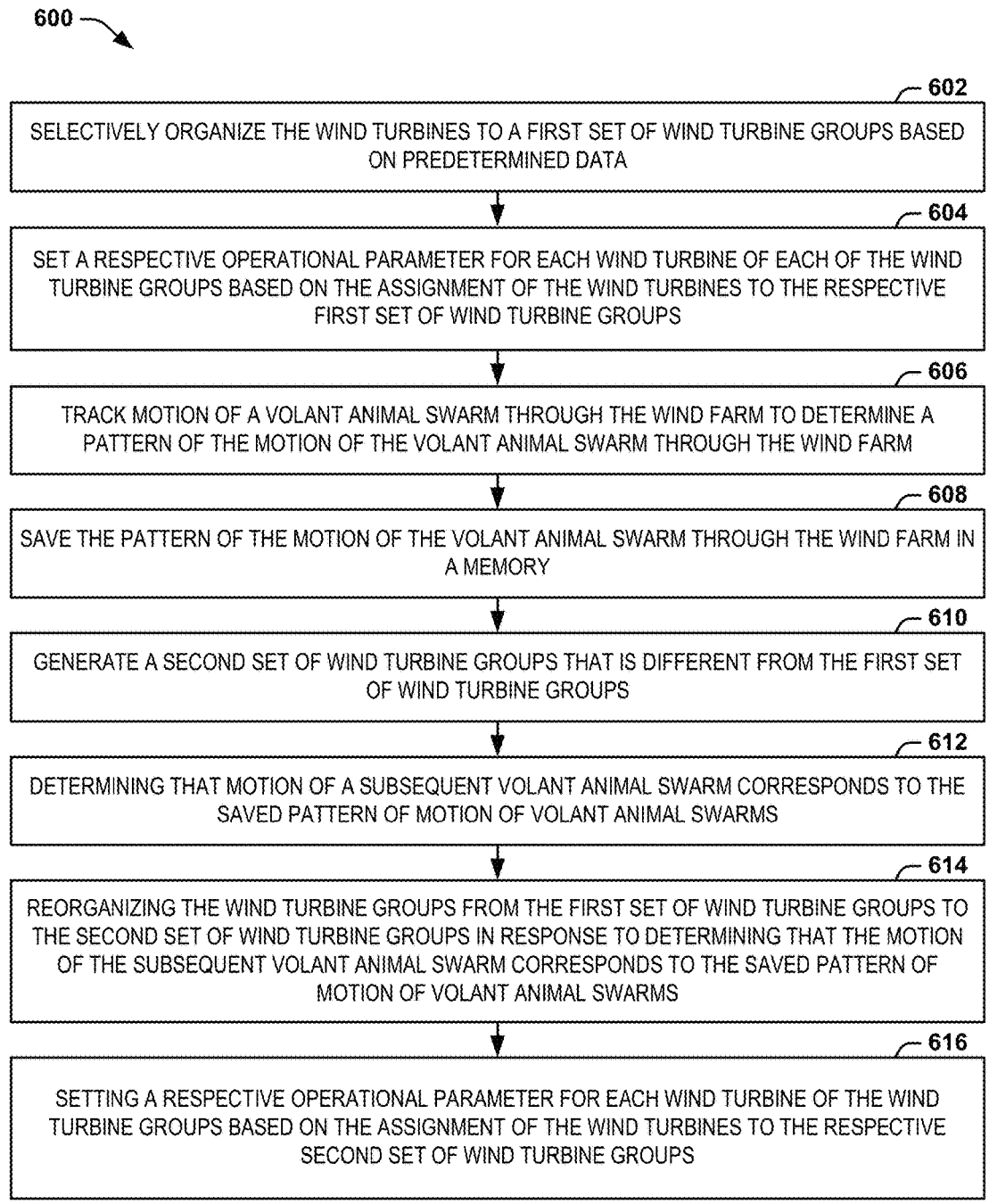
FIG. 13 illustrates another example of a method for controlling a wind farm.
Figure 14:
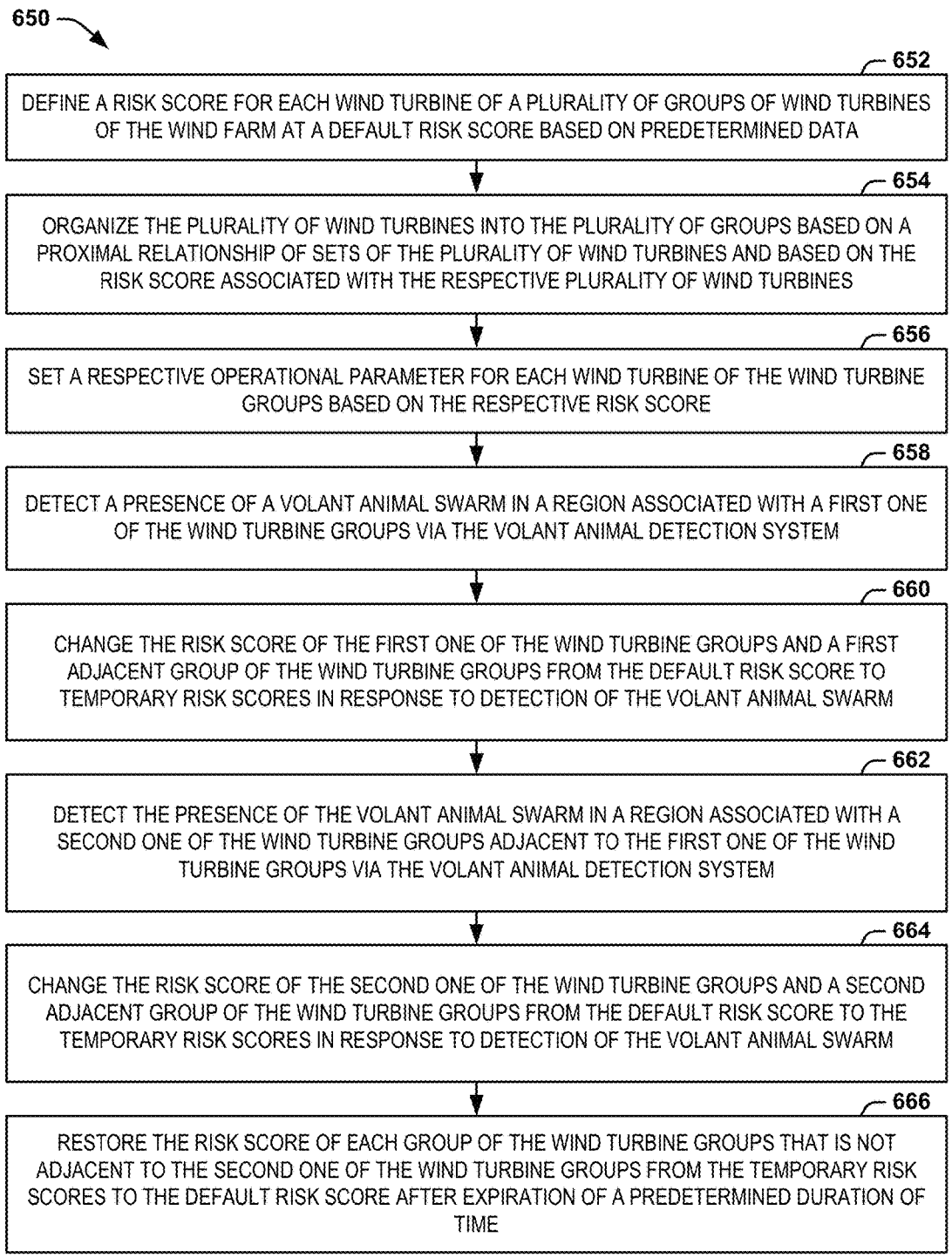
FIG. 14 illustrates yet another example of a method for controlling a wind farm.

In view of the foregoing structural and functional features described above, methods in accordance with various aspects of the present disclosure will be better appreciated with reference to FIGS. 12-14. While, for purposes of simplicity of explanation, the methods of FIGS. 12-14 are shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement methods in accordance with an aspect of the present disclosure.

FIG. 12 illustrates an example of a method 550 for controlling a plurality of wind turbines (e.g., wind turbines 14) at a wind farm (e.g., the wind farm 12). At 552, a risk score (e.g., a risk score 54) is defined for each of a plurality of wind turbine groups (e.g., the wind turbine groups 28) of the wind farm at a default risk score based on predetermined data (e.g., the predetermined data IN_DT). At 554, a respective operational parameter (e.g., cut-in speed) is set for each wind turbine of each of the wind turbine groups based on the respective risk score. At 556, a presence of a volant animal swarm (e.g., the volant animal swarm 152) is detected in a region of a given one of the wind turbine groups via a volant animal detection system (e.g., the volant animal detection system 16). At 558, the risk score of the given one of the wind turbine groups and an adjacent group of the wind turbine groups is changed from the default risk score to temporary risk scores in response to detection of the at least one volant animal.

FIG. 13 illustrates an example of a method 600 for controlling a plurality of wind turbines (e.g., the wind turbines 14) at a wind farm (e.g., the wind farm 12). At 602, each of the plurality of wind turbines are selectively organized to a first set of wind turbine groups (e.g., the wind turbine groups 28) based on predetermined data (e.g., the predetermined data IN_DT). At 604, a respective operational parameter (e.g., cut-in speed) is set for each wind turbine of the wind turbine groups based on the assignment of the wind turbines to the respective first set of wind turbine groups. At 606, motion of a volant animal swarm (e.g., the volant animal swarm 152) through the wind farm is tracked to determine a pattern of motion (e.g., the trajectory 306) of the volant animal swarm through the wind farm. At 608, the pattern of motion of the volant animal swarm through the wind farm is saved in a memory (e.g., the memory 22). At 610, a second set of wind turbine groups that is different from the first set of wind turbine groups is generated. The second set of wind turbine groups can include at least one group (e.g., the group 402) that corresponds to the saved pattern of motion of volant animal swarms. At 612, motion of a subsequent volant animal swarm corresponding to the saved pattern of motion of volant animal swarms is determined. At 614, the wind turbine groups are reorganized from the first set of wind turbine groups to the second set of wind turbine groups in response to determining that the motion of the subsequent volant animal swarm corresponds to the saved pattern of motion of volant animal swarms. At 616, a respective operational parameter (e.g., cut-in speed) is set for each wind turbine of the wind turbine groups based on the assignment of the wind turbines to the respective second set of wind turbine groups FIG. 14 illustrates an example of a method 650 for controlling a plurality of wind turbines (e.g., the wind turbines 14) at a wind farm (e.g., the wind farm 12). At 652, a risk score (e.g., a risk score 54) is defined for each wind turbine of a plurality of groups of wind turbines of the wind farm at a default risk score based on predetermined data (e.g., the predetermined data IN_DT). At 654, the plurality of wind turbines are organized into the plurality of wind turbine groups (e.g., the wind turbine groups 28) based on a proximal relationship of sets of the plurality of wind turbines and based on the risk score associated with the respective plurality of wind turbines. At 656, a respective operational parameter (e.g., cut-in speed) is set for each wind turbine of each of the wind turbine groups based on the respective risk score. At 658, the presence of a volant animal swarm (e.g., the volant animal swarm 152) is detected in a region of a first one of the wind turbine groups (e.g., the first group 102) via a volant animal detection system (e.g., the volant animal detection system 16). At 660, the risk score of the first one of the wind turbine groups and a first adjacent group of the wind turbine groups (e.g., the second group 104) is changed from the default risk score to temporary risk scores in response to detection of the volant animal swarm.

At 662, the presence of the volant animal swarm is detected in a region of a second wind turbine group (e.g., the second group 104) adjacent to the first one of the wind turbine groups via the volant animal detection system. At 664, the risk score of the second one of the wind turbine groups and a second adjacent group of the wind turbine groups (e.g., the third group 106) is changed from the default risk score to the temporary risk scores in response to detection of the volant animal swarm. At 666, the risk score of each group of the wind turbine groups that is not adjacent to the second one of the wind turbine groups is restored from the temporary risk scores back to the default risk score after expiration of a predetermined duration of time.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory computer-readable medium having instructions executable by a processor, the instructions programmed to perform a method for controlling a plurality of wind turbines associated with a wind farm, the method comprising:

defining a risk score for each of a plurality of wind turbine groups of the wind farm at a default risk score based on predetermined data;

setting a respective operational parameter for each wind turbine of each of the wind turbine groups based on the respective risk score;

detecting a presence of a volant animal swarm in a region of a given one of the wind turbine groups via a volant animal detection system;

tracking motion of the volant animal swarm through the wind farm via the volant animal detection system to detect a pattern of motion of volant animal swarms through the wind farm;

saving the pattern of motion of volant animal swarms in a memory;

assigning an adjusted default risk score associated with at least one of the wind turbine groups associated with the saved pattern of motion of volant animal swarms;

determining if motion of a subsequent volant animal swarm corresponds to the saved pattern of motion of volant animal swarms;

changing the risk score of the given one of the wind turbine groups and an adjacent group of the wind turbine groups from the default risk score to adjusted default risk scores in response to detection of the volant animal swarm and determination that the motion of the subsequent volant animal swarm corresponds to the saved pattern of motion of volant animal swarms; and organizing the plurality of wind turbines into the wind turbine groups and controlling one or more wind turbines within the wind turbine groups based on a proximal relationship of sets of the plurality of wind turbines and based on the risk score associated with the respective plurality of wind turbines and based on the pattern of motion of the volant animal swarm and the subsequent volant animal swarm through the wind farm.

2. The medium of claim 1, wherein organizing the plurality of wind turbines into the plurality of groups comprises assigning each of at least one wind turbine of the plurality of wind turbines into at least two groups of the plurality of groups.

3. The medium of claim 1, wherein the wind turbine groups are arranged as a first set of wind turbine groups, the medium further comprising:

generating a second set of wind turbine groups that is different from the first set of wind turbine groups and controlling one or more wind turbines within the second set of wind turbine groups, the second set of wind turbine groups comprising at least one group that corresponds to the saved pattern of motion of volant animal swarms;

determining that motion of a subsequent volant animal swarm corresponds to the saved pattern of motion of volant animal swarms; and reorganizing the wind turbine groups from the first set of wind turbine groups to the second set of wind turbine groups and controlling one or more turbines within the reorganized wind turbine groups in response to determining that the motion of the subsequent volant animal swarm corresponds to the saved pattern of motion of volant animal swarms.

4. The medium of claim 1, wherein defining the risk score comprises defining the risk score for each wind turbine of the wind turbine groups of the wind farm at the default risk score based on the predetermined data comprising at least one of:

location of each of the plurality of groups;

migration, habitat, and behavioral data associated with volant animals;

topographic and environmental data associated with the wind farm; and at least one of calendar date and time of day.

5. The medium of claim 1, wherein setting the respective operational parameter comprises setting a respective cut-in speed for each wind turbine of each of the wind turbine groups based on the respective risk score.

6. The medium of claim 1, further comprising:

detecting the presence of the volant animal swarm in a region of a second one of the wind turbine groups adjacent to the given one of the wind turbine groups via the volant animal detection system;

changing the risk score of the second one of the wind turbine groups and at least one other adjacent group of the wind turbine groups from the default risk score to the temporary risk scores in response to detection of the volant animal swarm; and restoring the risk score of each group of the wind turbine groups that is not adjacent to the second one of the wind turbine groups from the respective temporary risk scores to the default risk score after expiration of a predetermined duration of time.

7. The medium of claim 1, wherein the volant animal detection system is configured as an infrared detection system to detect bats.

8. The medium of claim 1, wherein detecting the presence of the volant animal swarm comprises comparing a quantity of the volant animal swarm with a threshold, wherein changing the risk score of the given one of the wind turbine groups comprises changing the risk score of the given one of the wind turbine groups in response to the quantity of the volant animal swarm exceeding a predetermined threshold.

9. A non-transitory computer-readable medium having instructions executable by a processor, the instructions programmed to perform a method for controlling a plurality of wind turbines at a wind farm comprising:

selectively organizing the plurality of wind turbines into a first set of wind turbine groups and controlling one or more wind turbines within the first set of wind turbine groups based on predetermined data;

setting a respective operational parameter for each wind turbine of each of the wind turbine groups based on the assignment of the wind turbines to the respective first set of wind turbine groups, wherein setting the respective operation parameter comprises setting a risk score to a default risk score based on predetermined data, the risk score defining a cut-in speed associated with each wind turbine of each of the wind turbine groups;

detecting a presence of a volant animal swarm in a region of the first set of wind turbine groups via a volant animal detection system;

tracking motion of the volant animal swarm through the wind farm to determine a pattern of the motion of the volant animal swarm through the wind farm;

saving the pattern of the motion of the volant animal swarm through the wind farm in a memory;

generating a second set of wind turbine groups that is different from the first set of wind turbine groups and controlling one or more wind turbines within the second set of wind turbine groups, the second set of wind turbine groups comprising at least one group that corresponds to the saved pattern of motion of volant animal swarms;

determining that motion of a subsequent volant animal swarm corresponds to the saved pattern of motion of volant animal swarms;

reorganizing the wind turbine groups from the first set of wind turbine groups to the second set of wind turbine groups and controlling one or more wind turbines within the reorganized wind turbine groups in response to determining that the motion of the subsequent volant animal swarm corresponds to the saved pattern of motion of volant animal swarms; and setting the respective operational parameter for each wind turbine of the wind turbine groups based on the assignment of the wind turbines to the respective second set of wind turbine groups, wherein setting the respective operation parameter comprises setting a risk score to a default risk score based on predetermined data;

changing the risk score of a given one of the first or the second wind turbine groups and an adjacent group of the wind turbine groups from the default risk score to a temporary risk scores in response to detection of the volant animal swarm.

10. The medium of claim 9, wherein tracking motion of the volant animal swarm comprises comparing a quantity of volant animals with a threshold, wherein changing the risk score of the given one of the wind turbine groups comprises changing the risk score of the given one of the wind turbine groups in response to the quantity of the volant animals exceeding a predetermined threshold.

11. The medium of claim 9, further comprising changing the default risk score associated with at least one of the wind turbine groups in response to determining that the motion of the subsequent volant animal swarm corresponds to the saved pattern of motion of volant animal swarms.

12. The medium of claim 9, wherein selectively organizing the plurality of wind turbines into the plurality of groups comprises assigning each of at least one wind turbine of the plurality of wind turbines into at least two groups of the plurality of groups.

13. A non-transitory computer-readable medium having instructions executable by a processor, the instructions programmed to perform a method for controlling a plurality of wind turbines at a wind farm, the method comprising:

defining a risk score for each wind turbine of a plurality of groups of wind turbines of the wind farm at a default risk score based on predetermined data;

organizing the plurality of wind turbines into the plurality of groups and controlling one or more wind turbines within the wind turbine groups based on a proximal relationship of sets of the plurality of wind turbines and based on the risk score associated with the respective plurality of wind turbines;

setting a respective operational parameter for each wind turbine of the wind turbine groups based on the respective risk score;

detecting a presence of a volant animal swarm in a region of a first one of the wind turbine groups via a volant animal detection system;

changing the risk score of the first one of the wind turbine groups and a first adjacent group of the wind turbine groups from the default risk score to temporary risk scores in response to detection of the volant animal swarm;

detecting the presence of the volant animal swarm in a region of a second one of the wind turbine groups adjacent to the first one of the wind turbine groups via the volant animal detection system;

changing the risk score of the second one of the wind turbine groups and a second adjacent group of the wind turbine groups from the default risk score to the temporary risk scores in response to detection of the volant animal swarm; and restoring the risk score of each group of the wind turbine groups that is not adjacent to the second one of the wind turbine groups from the temporary risk scores to the default risk score after expiration of a predetermined duration of time.

14. The medium of claim 13, further comprising:

tracking motion of the volant animal swarm through the wind farm via the volant animal detection system to detect a pattern of motion of volant animal swarms through the wind farm; and saving the pattern of motion of volant animal swarms in a memory; and organizing the plurality of wind turbines into the wind turbine groups and controlling one or more wind turbines within the wind turbine groups based on the proximal relationship of the sets of the plurality of wind turbines and based on the pattern of motion of the volant animal swarm through the wind farm.

15. The medium of claim 14, wherein the wind turbine groups are arranged as a first set of wind turbine groups, the medium further comprising:

generating a second set of wind turbine groups that is different from the first set of wind turbine groups and controlling one or more wind turbines within the second set of wind turbine groups, the second set of wind turbine groups comprising at least one group that corresponds to the saved pattern of motion of volant animal swarms;

determining that motion of a subsequent volant animal swarm corresponds to the saved pattern of motion of volant animal swarms; and reorganizing the wind turbine groups from the first set of wind turbine groups to the second set of wind turbine groups and controlling one or more wind turbines within the reorganized wind turbine groups in response to determining that the motion of the subsequent volant animal swarm corresponds to the saved pattern of motion of volant animal swarms.

16. The medium of claim 14, further comprising:

assigning an adjusted default risk score associated with at least one of the wind turbine groups associated with the saved pattern of motion of volant animal swarms;

determining that motion of a subsequent volant animal swarm corresponds to the saved pattern of motion of volant animal swarms; and setting the default risk of each of the at least one of the wind turbine groups to the adjusted default risk score in response to determining that the motion of the subsequent volant animal swarm corresponds to the saved pattern of motion of volant animal swarms.

* * * * *